US012631806B2

(12) United States Patent
Pau et al.

(10) Patent No.: US 12,631,806 B2
(45) Date of Patent: May 19, 2026

(54) DIFFRACTIVE OPTICS HAVING TRANSVERSELY DISTRIBUTED MULTIPLE FOCI

(71) Applicant: Arizona Board of Regents on Behalf of the University of Arizona, Tucson, AZ (US)

(72) Inventors: Stanley Pau, Tucson, AZ (US); David Brady, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 18/572,941

(22) PCT Filed: Jun. 15, 2022

(86) PCT No.: PCT/US2022/033518
§ 371 (c)(1),
(2) Date: Dec. 21, 2023

(87) PCT Pub. No.: WO2022/271494
PCT Pub. Date: Dec. 29, 2022

(65) Prior Publication Data
US 2024/0264342 A1 Aug. 8, 2024

Related U.S. Application Data

(60) Provisional application No. 63/213,591, filed on Jun. 22, 2021.

(51) Int. Cl.
*G02B 5/18* (2006.01)
*G02B 1/02* (2006.01)

(52) U.S. Cl.
CPC ......... *G02B 5/1814* (2013.01); *G02B 5/1842* (2013.01); *G02B 1/02* (2013.01); *G02B 2005/1804* (2013.01)

(58) Field of Classification Search
CPC ................ G02B 5/1814; G02B 5/1842; G02B 2005/1804
USPC ................................. 359/619, 742, 565, 569
See application file for complete search history.

(56) References Cited

U.S. PATENT DOCUMENTS

| | | | | |
|---|---|---|---|---|
| 3,807,829 A | | 4/1974 | Close | |
| 5,978,139 A | * | 11/1999 | Hatakoshi ............ | G02B 5/1876 |
| 6,020,090 A | * | 2/2000 | Takada ..................... | G02B 5/32 |
| | | | | 430/1 |

(Continued)

OTHER PUBLICATIONS

Buralli et al., Optical Performance of Holographic Kinoforms, Applied Optics, 1989, 28(5):976-983.

(Continued)

*Primary Examiner* — Audrey Y Chang
(74) *Attorney, Agent, or Firm* — Quarles & Brady LLP; Yakov S. Sidorin

(57) ABSTRACT

A diffractive optical element configured as a lens having such an aperture function that causes light incident onto such lens to form a multiplicity of focal points (whether real or virtual) that do not lie along the same axis transverse to the surface of such lens, thereby simultaneously forming a multiplicity of spatially-independent optical images distributed transversely to a normal drawn to a surface of such lens. A method of using such diffractive optical element.

15 Claims, 12 Drawing Sheets

(56)     References Cited

U.S. PATENT DOCUMENTS

| | | | |
|---|---|---|---|
| 8,866,997 | B2 | 10/2014 | Pau et al. |
| 9,320,594 | B2 | 4/2016 | Schwiegerling |
| 9,671,538 | B2 | 6/2017 | Pau et al. |
| 10,634,557 | B2 | 4/2020 | Khorasaninejad et al. |
| 10,652,444 | B2 | 5/2020 | Horstmeyer et al. |
| 10,705,401 | B1 | 7/2020 | Lu et al. |
| 10,871,601 | B2 | 12/2020 | Bablumyan et al. |
| 2004/0062180 | A1 | 4/2004 | Mimori et al. |
| 2012/0060920 | A1* | 3/2012 | Fornari ................... F24S 23/31 359/619 |
| 2013/0286309 | A1 | 10/2013 | Valley et al. |
| 2017/0212285 | A1 | 7/2017 | Arbabi et al. |
| 2019/0287495 | A1 | 9/2019 | Mathur et al. |
| 2020/0150323 | A1 | 5/2020 | Tabirian et al. |

OTHER PUBLICATIONS

Cai et al., Inverse Design of Metasurfaces with Non-Local Interactions, njp Computational Materials, 2020, 6(1):116, pp. 1-8.
Faklis et al., Spectral Properties of Multiorder Diffractive Lenses, Applied Optics, 1995, 34(14):2462-2468.
PCT International Search Report and Written Opinion, PCT/US2022/033518, Sep. 12, 2022, 11 pages.

* cited by examiner

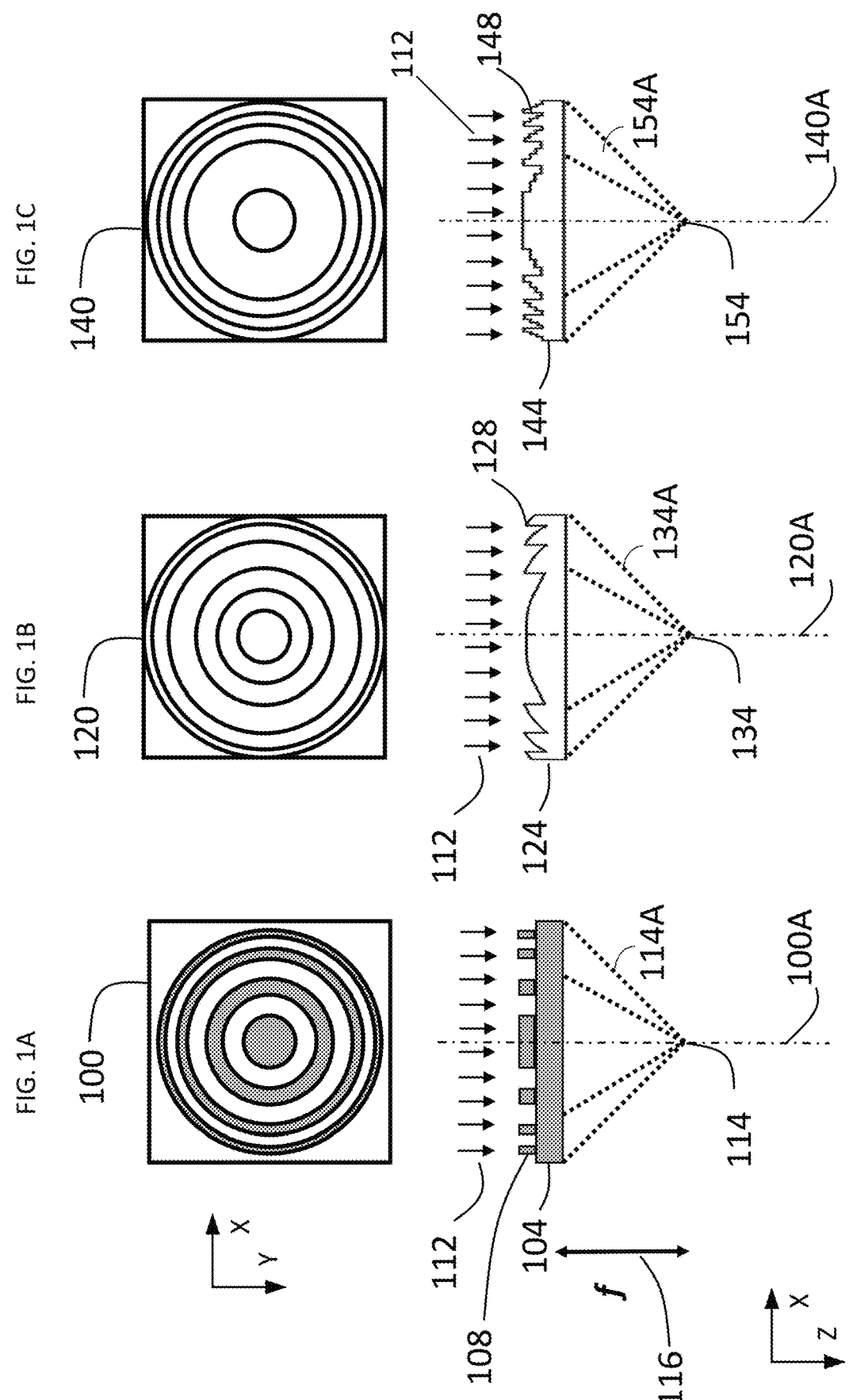

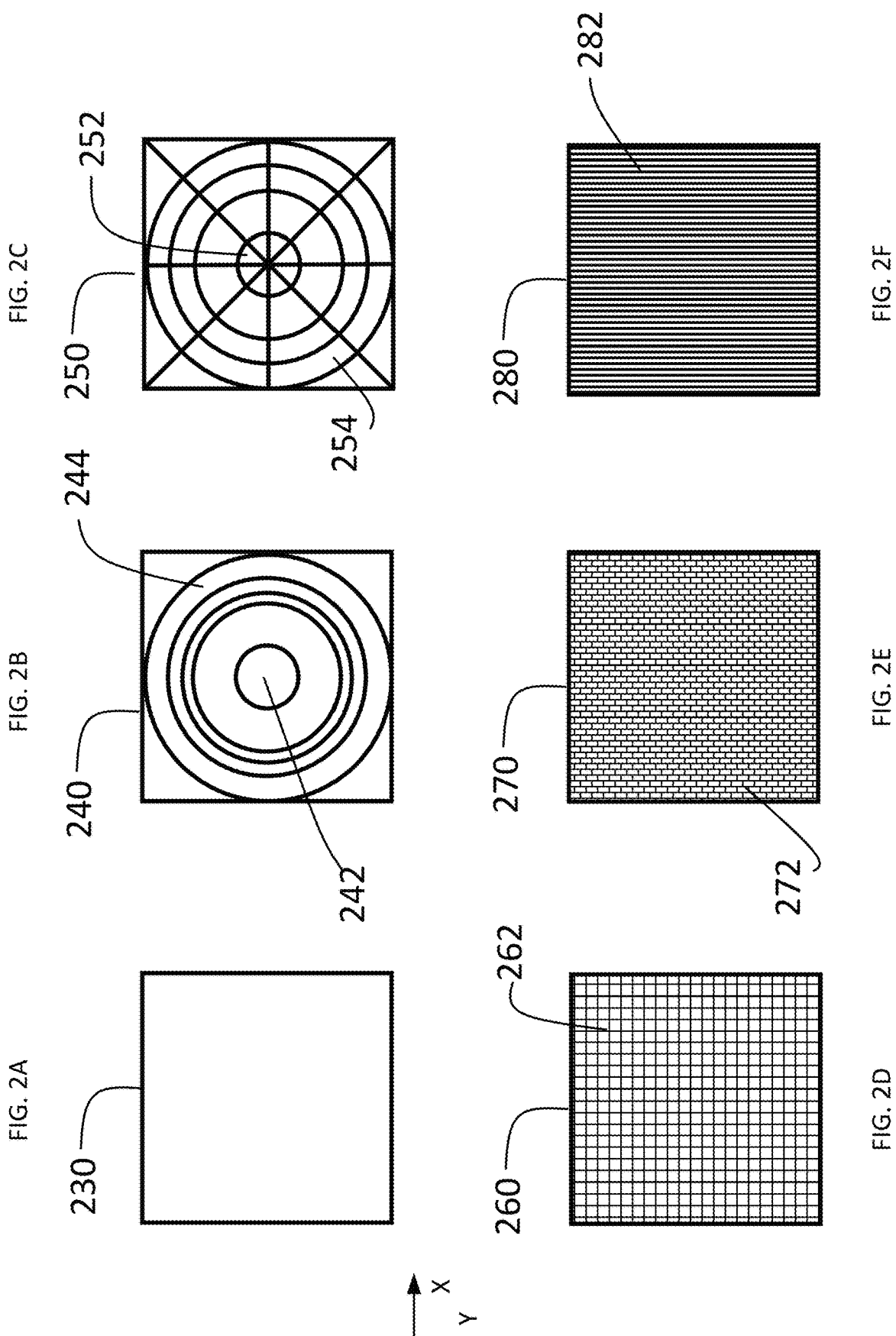

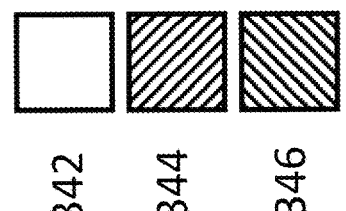
342
344
346
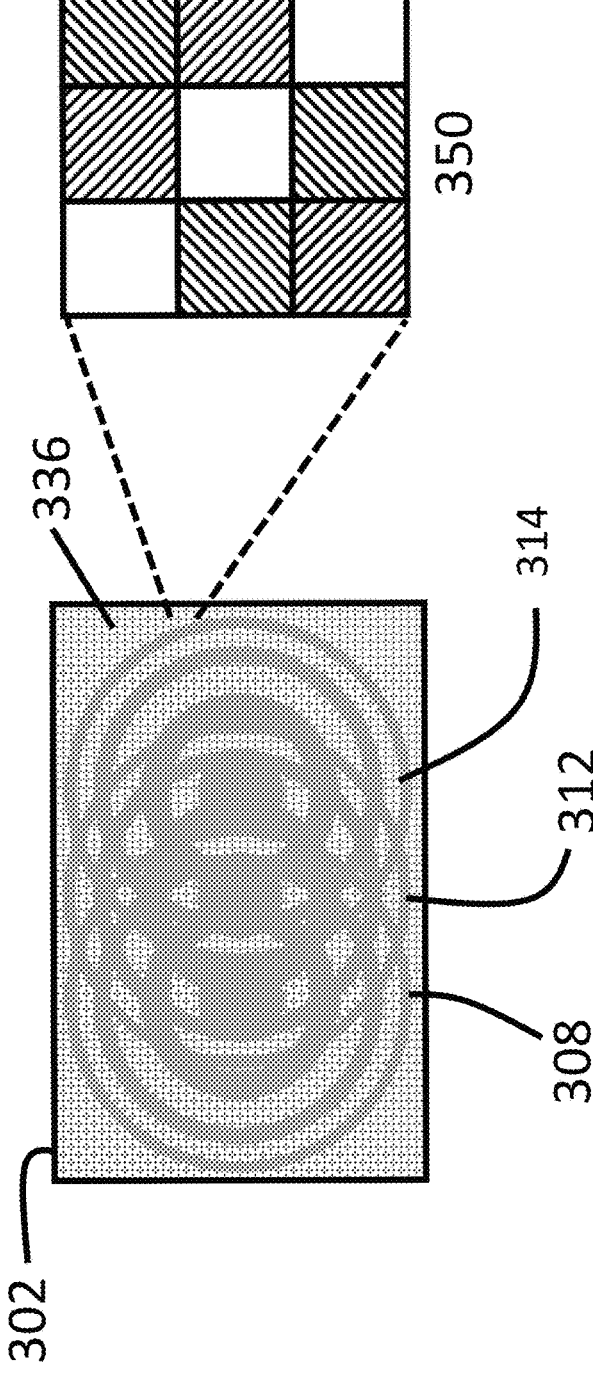
350
336
314
312
308
302
FIG. 3B

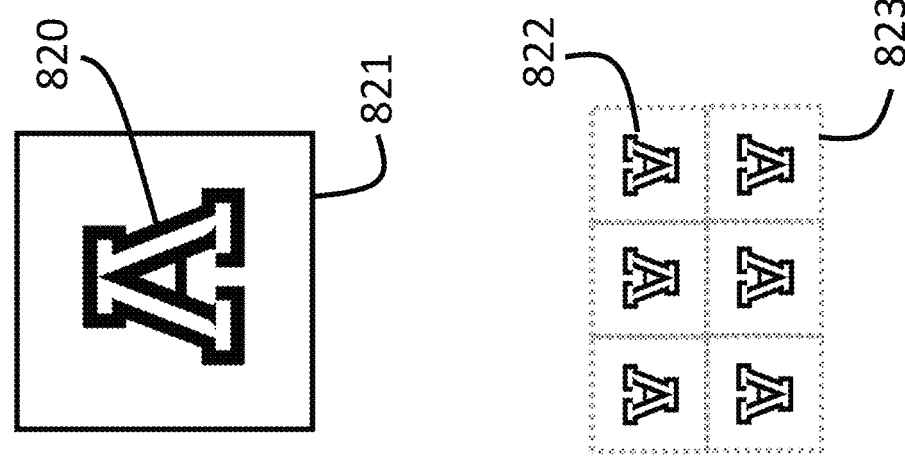
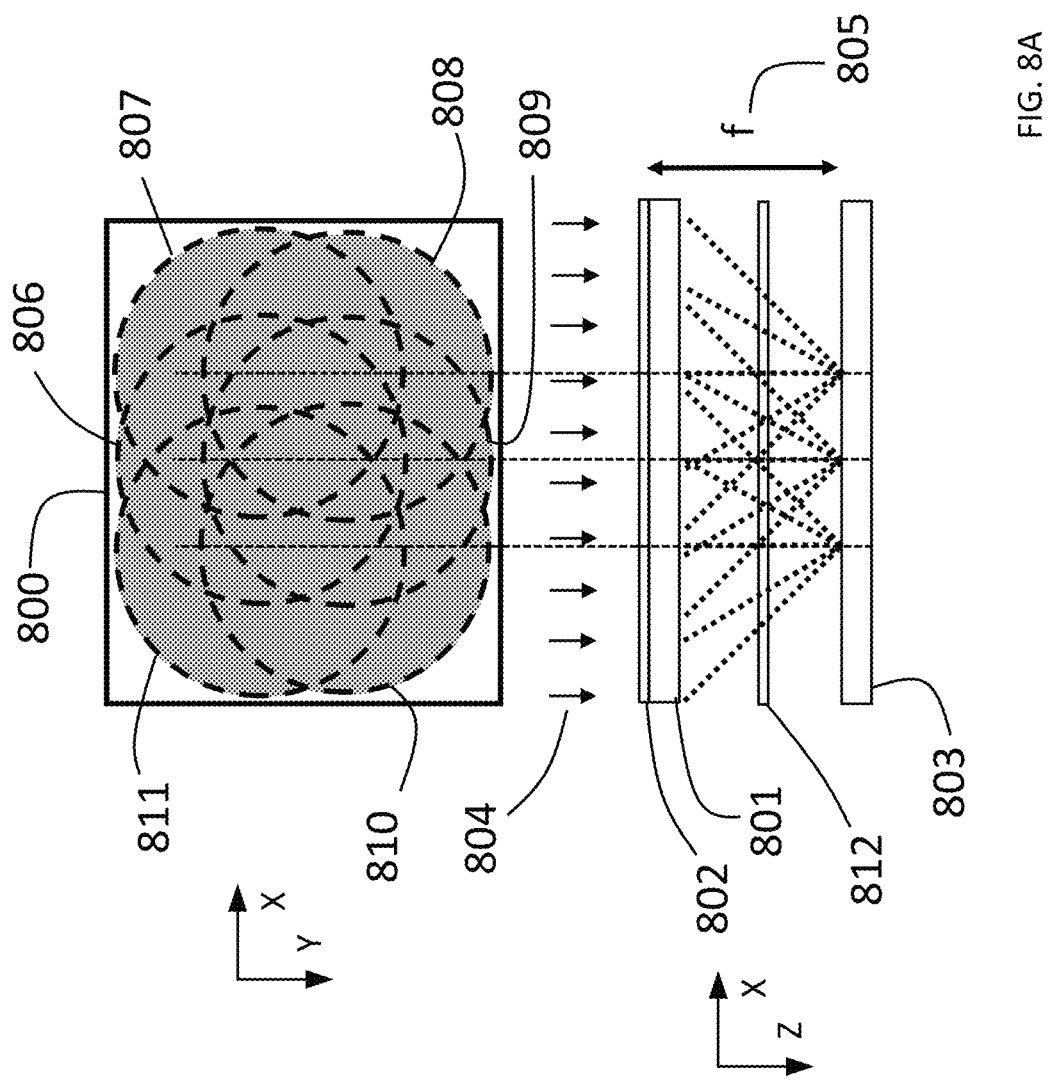
FIG. 8A

DIFFRACTIVE OPTICS HAVING TRANSVERSELY DISTRIBUTED MULTIPLE FOCI

CROSS-REFERENCE TO RELATED APPLICATIONS

This US Patent Application is a national phase of the International Patent Application PCT/US2022/033518 filed on Jun. 15, 2022 and now published as WO 2022/271494, which claims priority from and benefit of U.S. Provisional Patent Application No. 63/213,591 filed on Jun. 22, 2021. The disclosure of each of the above-identified patent documents is incorporated by reference herein.

TECHNICAL FIELD

The present invention relates to a diffractive optical element (DOE) or system configured to operate as a specific form of a lens—the lens that possesses multiple focal points distributed in or on a surface that is transverse to an axis drawn to be perpendicular to a surface of such lens.

RELATED ART

A commonly-used classical version of a diffractive optical element is the so-called Fresnel lens that has a surface profile divided into multiple circular zones, which may be designed for operation at a single wavelength or multiple wavelengths. Multiple foci of such diffractive lens are distributed along the same axis passing through a center of the lens and, as a result, simultaneous registration of images formed by such conventional lens in relation to its multiple foci is substantially prevented as long as some kind of beam-splitting arrangement is used (because, understandably, an optical detector placed at the location of the first image at the axis effectively blocks the light from propagating to the location of the second image).

SUMMARY

Embodiments of the invention provide a diffractive lens that includes an optical substrate having an incident surface and a spatial material pattern carried on or formed in the optical substrate and defined by multiple contiguous areas of the diffractive lens. Here, a first area of the multiple contiguous areas is configured to introduce a first phase change in a first portion of a light wavefront incident onto the incident surface (and propagating through the first area) while a second area of the multiple contiguous areas is configured to introduce a second phase change in a second portion of the light wavefront (that propagates through the second area) such that the first phase change and the second phase change are different for every two immediately-neighboring areas of the multiple contiguous areas. The diffractive lens is configured to converge the incident light wavefront into multiple focal points that are separated from one another along a surface of the diffractive lens by a predetermined distance regardless of whether said light is substantially polychromatic or substantially monochromatic. (In at least one specific implementation, the diffractive lens is necessarily configured as a single monolithic optical component and/or is configured to operation in transmission.) Additionally or alternatively, the multiple focal points may include a first focal point and a second focal point that are separated from one another by the predetermined distance along an axis that is substantially perpendicular to a normal drawn to a surface of the optical substrate. (Here, a spatial distribution of the first phase change across the first area is that characterizing or possessed by a first phase Fresnel lens element, while a spatial distribution of the second phase change across the second area is that characterizing or possessed by a second phase Fresnel lens element that is spatially shifted with respect to the first phase Fresnel element along the axis by the predetermined distance.)

Substantially in every implementation, the spatial material pattern may be defined in a material stack that includes a layer of the optical substrate and/or at least one layer of material carried by the layer of the optical substrate; and/or the layer of the optical substrate may include one or more of a surface relief structure and a non-uniform distribution of a refractive index across the layer of the optical substrate. At least in one of implementations, a diffractive lens may be additionally configured to satisfy at least one of the following multiple conditions is satisfied: (i) the at least one layer of material carried by the layer of the optical substrate includes one or more of an optical coating and a layer of liquid crystal material; (ii) the at least one layer of material carried by the layer of the optical substrate defines a phase-mask from a transparent material such as oxide; (iv) the surface relief structure across the layer of the optical structure includes: a first surface profile (defined by a first center and a first plurality of annular zones that are concentric about the first center) and a second surface profile defined by a second center and a second plurality of annular zones that are concentric about the second center (here, a separation between the first and second centers defined along the surface of the diffractive lens is substantially equal to the predetermined distance).

Additionally or in the alternative, in at least one implementation of the diffractive lens the layer of the optical substrate may be configured to contain a hologram; and/or the diffractive lens may be configured to carry out or effectuate at least one of the following: (a) to converge a portion of the incident light wavefront that has a first wavelength into a first focal point of the multiple focal points and to converge a portion of the light wavefront that has a second wavelength into a second focal point of such multiple focal points; (b) to converge to a portion of the incident light having a first state of polarization into a third focal point of the multiple focal points and to converge a portion of such light incident onto the incident surface and having a second state of polarization into a fourth focal point of the multiple focal points; (c) to form multiple spatially-distinct from one another images of an object space being imaged, each image located in a respective image plane corresponding to and/or containing one of the multiple focal points. In one or more of specific embodiment, a diffractive lens may be configured to optically image the object space such that a first ratio of a first image distance to a first object distance is different from a second ratio of a second image distance to a second object distance. (Here, the first image distance is that between the diffractive lens and a first image of the multiple images, and the first object distance is that corresponding to the first image, while a second image distance is that between the diffractive lens and a second image of the multiple images and the second object distance is that corresponding to the second image.) Moreover, embodiments include an optical imaging system that includes or utilizes a diffractive lens configured according to any of the above-identified implementations and, in at least one case, such optical imaging system is configured as a Fourier ptychography system.

Embodiments of the invention further provide a method for forming an optical image. The method includes using a diffractive lens configured according to any and/or every of the above-identified embodiments; the step of receiving light at an incident surface of such diffractive lens, and the step of converging this light (which has interacted with the diffractive lens) to multiple focal points that are separated from one another along a surface of the diffractive lens by a predetermined distance regardless of whether the light is substantially polychromatic or substantially monochromatic. In one specific version, the method may additionally include transmitting a first portion of incident (received) light through a first area of the diffractive lens to introduce a first phase change to such first portion of the light; transmitting a second portion of received light through a second area of the diffractive lens to introduce a second phase change to such second portion of the light. (In this case, respective boundaries of the first and second areas share at least a point, and a spatial distribution of the first phase change across the first area is that characterizing a first phase Fresnel lens element. In this case, further, a spatial distribution of the second phase change across the second area is that characterizing a second phase Fresnel lens element that is substantially identical to the first phase Fresnel lens element but that is spatially shifted along the axis by the pre-determined distance, as compared with the first Fresnel lens element.) In at least one implementation, the method may additionally or alternatively include at least one of the following actions: (a) when the light incident onto the incident surface is polychromatic, changing a degree of divergence of a portion of such light having a first wavelength to define a first focal point of the multiple focal points and changing a degree of divergence of a portion of such light having a second wavelength to define a second focal point of the multiple focal points; and (b) when such light incident onto the incident surface is characterized by more than one state of polarization, changing a degree of divergence of a portion of such light with a first state of polarization to define a third focal point of the multiple focal points and converging a portion of such light with a second state of polarization to define a fourth focal point of the multiple focal points; and (c) forming multiple images, each located in a respective image plane corresponding to one of the multiple focal points, of an object space being imaged. In at least one of implementations, the method may include—alternatively or in addition—the step of forming a first image of the multiple images with a first ratio of an object distance to an image distance while forming a second image of the multiple images with a second ratio of an object distance to an image distance. Moreover, in at least one embodiment, the method may include a step of interacting the light incident onto the incident surface of the diffractive lens with a spatial pattern defined in a material layer that includes a layer of the optical substrate and/or at least one layer of material carried by the layer of the optical substrate. In at least one case, the layer of the optical substrate may be configured to include one or more of a surface relief structure and a non-uniform distribution of a refractive index across the layer of the optical substrate.

BRIEF DESCRIPTION OF THE DRAWINGS

The invention will be more fully understood by referring to the following Detailed Description of Specific Embodiments in conjunction with the not-to scale Drawings, of which:

FIGS. 1A, 1B, and 1C provide schematic diagrams of conventionally-structured diffractive Fresnel lenses, in two views: top view and side view.

FIG. 2A illustrates, in top view, an optical aperture defined by an optical substrate.

FIG. 2B illustrates a division of the surface area of the optical aperture of FIG. 2A to concentric areal zones characterized by specifically-defined phase delays according to the principle underlying a configuration of a conventional Fresnel lens.

FIGS. 2C, 2D, 2E, and 2F provide non-limiting examples of configurations of division of the surface area of the optical aperture of FIG. 2A to area or zones characterized by specifically-defined phase delays according to the idea of the present invention.

FIGS. 3A and 3B address a division of an optical aperture of a chosen optical substrate into areas or zones characterized by specifically-defined phase functions according to one embodiment of the invention, in reference to those of a conventional Fresnel lens.

FIG. 8A shows, in top and side views, a schematic of an embodiment of a one snapshot Fourier ptychographic imaging system employing a diffractive lens structured according to the idea of the invention, as well as a collections of diffraction images of an object simultaneously acquired at different spatial locations with such a system.

Figure 3A:
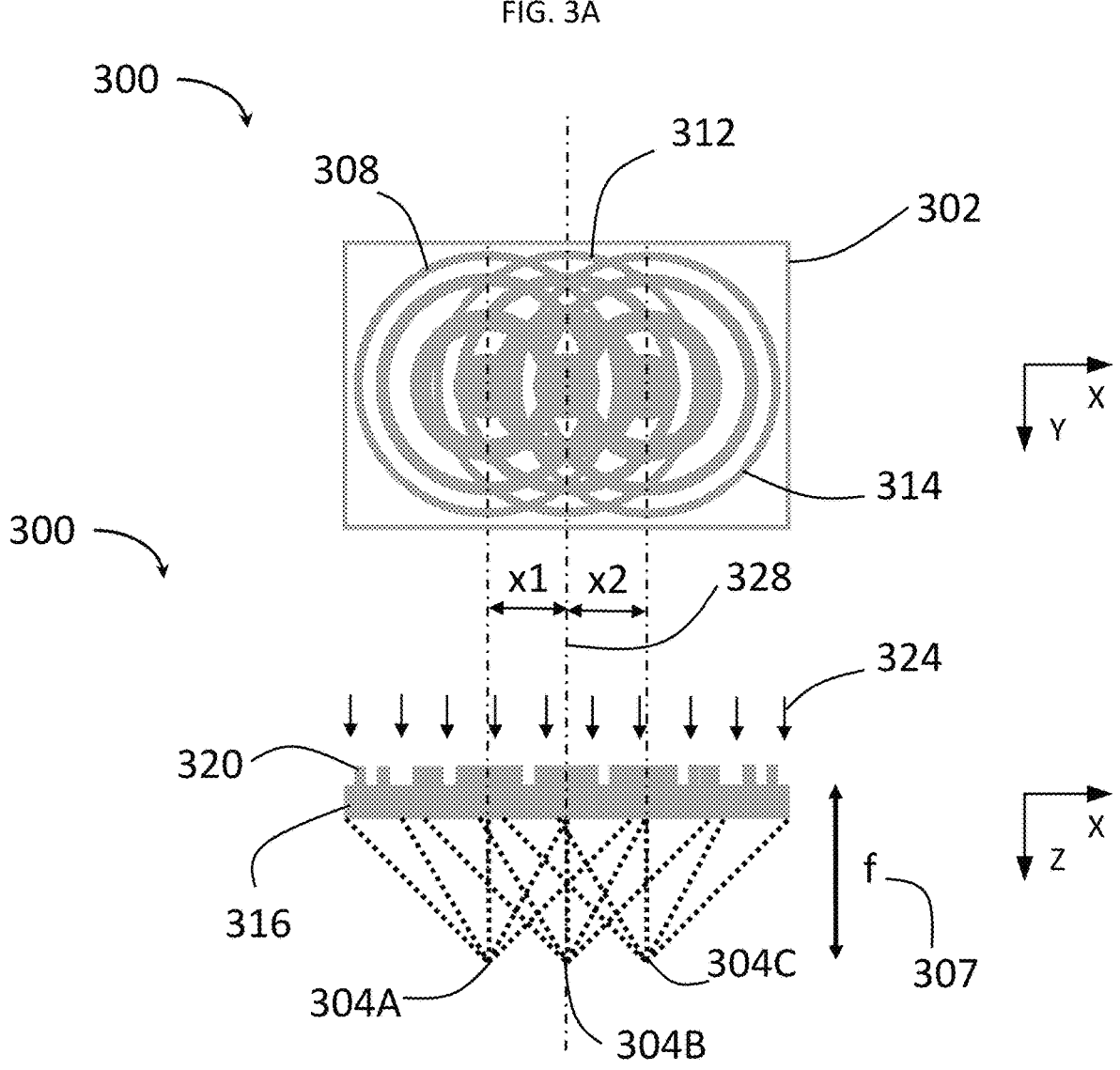

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with preferred embodiments of the present invention, methods and apparatus are disclosed for a diffractive optical lens characterized by multiple foci (formed in either substantially monochromatic or substantially polychromatic light) that are necessarily spatially separated from one another along an axis transverse to a normal that is drawn to the surface of the diffractive optical lens. A disclosure of each patent document referred to in this application is incorporated herein by reference.

A commonly-used classical version of a diffractive optical lens is the so-called Fresnel lens that has a surface profile divided into multiple circular zones, which may be designed for operation at a single wavelength or multiple wavelengths. Three examples of such Fresnel lens—100, 120, 140, shown to have substantially equal focal lengths f; respective axes 100A, 120A, 140A and differing from one another in terms of their surface profiles—are shown schematically in FIGS. 1A, 1B, and 1C.

In reference to the schematic of the lens 100 of FIG. 1A as an example, a Fresnel lens is typically fabricated with the use of a substrate 104 and an amplitude and/or phase structure or mask 108 in a form of concentric circular rings patterned on the substrate 104. Incoming (incident onto such lens substantially parallel to lens' axis 100A) light 112 (shown in this example to have a substantially planar wavefront) is converged, 114A, into a focal point 114 (in this case located at a focal length f; 116 from the output surface of the lens 100 on the optical axis 100A. In the example of Fresnel lens 120 of FIG. 1B, the lens 120 is made by carving (or otherwise forming) annular concentrically-patterned diffractive surface 128 in the substrate 124. Incoming or incident (substantially-collimated, as shown, along the lens' axis 120A) light 112 is converged by such lens, 134A, into a focal point 134 at a focal length f away from the output surface of the lens 120 along the optical axis 120A. The Fresnel lens 140 of FIG. 1C is made by forming a multi-step annular concentric diffractive pattern 148 in the incident surface of the substrate 144. In operation of such lens 140, light 112 incident only the lens 140 along its optical axis 140A is focused, 154A, into a point 154 on the optical axis of the lens 140. It is recognized that a given implementation of a Fresnel lens (such as the lens 100, 120, 140) can be designed to form multiple focal points along the optical axis of the lens, as disclosed for example in U.S. Pat. No. 9,320,594 (the disclosure of which is incorporated by reference herein).

A skilled person recognizes that the phase function $\phi(x, y)$ of a converging spherical wave (114A, 134A, 154A formed, respectively, by Fresnel lenses 100, 120, 140) of radius f is given by $$\phi(x, y) = \alpha 2\pi \left( m - \frac{\sqrt{f^2 + r^2} - f}{\lambda_0} \right), \, r_m \leq r < r_{m+1}, \tag{1}$$

where m is an integer label for the different Fresnel zone, $r_m$ is the zone radius of the m-th zone, $r = \sqrt{x^2 + y^2}$ and $\alpha$ is the fraction of phase delay that is introduced for wavelengths $\lambda$ other than the design wavelength $\lambda_0$.

$$\alpha = \frac{\lambda_0 n(\lambda) - 1}{\lambda n(\lambda_0) - 1} \tag{2}$$

In the paraxial approximation, the phase function (1) can be expressed as $$\phi(x, y)_{paraxial} = \alpha 2\pi \left( m - \frac{r^2}{2\lambda_0 f} \right) \tag{3}$$

A skilled person readily appreciates that this phase function represents an aperture function of a corresponding phase Fresnel lens (that is, the function describing a spatial distribution, across the corresponding lens aperture, of the phase change introduced by such Fresnel lens to a planar-wavefront light 112 propagating through such lens). The full and/or paraxial versions of a spatial distribution of phase expressed by (1) and (3) will now be referred to as a spatial distribution of phase introduced in or to incident light by a conventional Fresnel lens (interchangeably referred to as a phase Fresnel lens element).

While various version of diffractive lenses operating according to a similar principle have been demonstrated— such as, for example, holographic Fresnel lenses (U.S. Pat. Nos. 3,807,829, 10,871,601), metamaterial diffractive lenses (e.g., U.S. Pat. No. 10,634,557), or liquid-crystal-based diffractive lenses (see, e.g., U.S. Pat. Nos. 8,866,997; 9,671, 538; 10,795,401)—none of the implementations of a diffractive lens of related art allows for such a diffractive lens that possesses multiple focal points that are spatially-distributed not along the optical axis of the lens but along a surface of such lens (that is, in a surface transverse to the optical axis) while operating in either polychromatic light or monochromatic light (that is, regardless of spectral content of light incident onto a diffractive lens).

A person of ordinary skill in the art will understand that such shortcoming imposes a substantial limitation of how the implementations of DOE currently known in related art can be employed. For example, the simultaneous imaging of an object into multiple—and, optionally not even overlapping, areas—without the use of some sort of an additional spatial beamsplitter in conjunction with the diffractive lens of the related art.

Embodiments of the present invention—that is, the DOE-type lenses referred to below, for simplicity, as SPDB-lenses or SPDB optical elements—address the unsatisfied need of related art. In particular, a need in a lens that converges light to multiple focal points spatially-separated from one another along a surface of the lens by pre-determined distance(s) regardless of whether such light is poly- or mono-chromatic is solved by providing a diffractive SPDB-lens configured on or in an optical substrate that includes multiple contiguous substrate areas. The overall spatial distribution of a phase change, experienced by light incident onto the SPDB-lens and interacting with its lens areas, is represented by and corresponds to a combination of multiple respectively-corresponding spatial phase distributions introduced into such light by a combination of single focal length Fresnel lenses each having concentric Fresnel zones and shifted with respect to one another along the surface of the lens by such pre-determined distance(s). Here, immediately neighboring surface areas necessarily define different spatial distributions of corresponding phase changes.

The idea of the invention stems from the realization that the spatial distribution of the phase delay (required for diffraction-based redistribution of the incident optical wavefront into a multiplicity of the desired focal points upon the propagation of light through the SPDB-lens) can be achieved by subdividing the aperture of a DOE into multiple zones or areas and configuring each of these multiple lens-areas to have a corresponding aperture phase function that differs—in a specific, judiciously pre-defined fashion— from the aperture phase function of an immediately neighboring lens-area. In this case, the overall SPDB diffractive lens is defined by such multiple contiguous areas and forms (as a result of diffraction of light in the far-field) multiple focal points distributed transversely to the axis of such DOE.

Several examples provided in FIGS. 2A, 2B, 2C, 2D, 2E, and 2F illustrate the implementation of the proposed concept according to which an aperture of a given diffractive lens is be divided into different zones or areas. Each of these areas on a diffractive lens introduces a phase shift (to light propagating through such area) that is represented by a modified function ϕ(x, y). The conventional, common types of lenses are illustrated as a holographic lens 230 (FIG. 2A) and surface-relief diffractive lens 240. (FIG. 2B). Several related implementations of the idea of the present invention are schematically illustrated in FIGS. 2C through 2F.

The example 230 illustrates a holographic optical lens where the entire aperture of the lens is considered as one area. A holographic optical lens is a thin film device made of a hologram in a recording material. A thin hologram has thickness much less than the period of the interference fringes of the hologram. A thick hologram, such as a Volume Holographic Optical Element, has a thickness much larger than the period of the interference fringes of the hologram. An example of 240 is a Fresnel lens, already alluded to in reference to FIGS. 1A through 1C, in which the aperture is divided into what is known as Fresnel zones—a circle 242 and annular rings 244.

According to the idea of the present invention, the overall aperture of a DOE can be sub-divided into a multiplicity of areas in various ways in order to form an embodiment of a SPDB element. In one example of FIG. 2C, the aperture 250 is divided into pie-sectors 252 and arcuate zones 254. The aperture 260 of FIG. 2D is shown to be divided into a grid (a two-dimensional array) of substantially squarely-shaped elements or areas 262. The aperture 270 of FIG. 2E is shown to be divided into a grid of rectangular elements or zones 272. The aperture 280 of FIG. 2F is sub-divided into an array of rectangular linear (stripe-shaped) elements (this contraption may be used to form a cylindrical version of an implementation of a multifocal diffractive lens of the invention). In some embodiments, the overall aperture may be divided into aperiodically and/or periodically distributed contiguous zones or areas with fixed, varying, or even randomized shapes, as long as at least the following conditions are satisfied: (1) the so-distributed contiguous zones cover substantially all of the overall aperture (preferably, this coverage should be as close to 100% as possible (however, with a lower limit of at least 50%), since light that is incident on the area of the clear aperture of the lens of the device not covered by/split into such zones will not be focused as planned and, as a result, is likely to act as a background signal), (2) the different contiguous zones or areas are designed with the appropriate phase functions for each of the focal points, as discussed below; (3) the zones or areas of a given type are distributed across the aperture with a substantially uniform spatial density, (4) the ratio of aggregate areas of all zones of one type to that of another type is approximately equal to the ratio of radiative powers light directed by the lens to the respectively corresponding different focal points, and (5) the areas, shapes and tiling pattern of different of zones or areas are chosen to minimize parasitic diffraction and stray light at the resulting structure.

One possible implementation of assignment of aperture phase functions to the multiple areas or zones within the overall aperture of the SPDB lens can be illustrated with the use of an example of a most conventional surface relief structure—the one employed in a typical phase Fresnel lens constructed in an optically-transparent substrate by "carving" or otherwise (for example, photolithographically defining and etching) concentric annular grooved to identify Fresnel zones. Such illustration is schematically provided in reference to FIGS. 3A and 3B illustrating, respectively, a top view and a side view of the embodiment 300 of an SPDB-lens.

As shown, FIG. 3A illustrates a generalized structure of the embodiment 300 of the invention that is configured to operate as a diffractive lens with a chosen aperture 302. FIG. 3A contains two schematic views of the embodiment 300: a top view and a side view. The SPDB-lens 300 has multiple (as shown—three) focal points 304A, 304B, 304C separated from one another by predetermined distance(s) along a surface of the lens. In simple terms, the embodiment 300 is configured to operate as if its aperture phase function were composed of the aperture functions of the multiple (in this example—three) independent phase Fresnel lens elements that are laterally—in the plane of the substrate 316—shifted with respect to one another, each configured to operate as if the other two were not present. This notion—but not the presence of the three independent Fresnel lens elements is schematically depicted by the annular patterns 308, 312, and 314 associated with such constituent lens elements that are shifted with respect to one another—along a chosen axis in the plane of the lens 300, and spatially overlap with one another in the plane of the substrate 316 of the lens 300).

However, it is appreciated that the cumulative effect produced by the embodiment 300 (and equal to that would be produced by the presence of the three independent Fresnel lenses configured as recited above) is not at all the result of combining the three independent conventional concentric Fresnel lens patterns (similar to that of FIGS. 1A-1C, for example) on the same substrate (although the overall lens 300 formed in the substrate 316 carrying a diffractive spatial pattern 320 that is represented by a relief surface pattern in this case).

Incoming light 324 is focused onto three focal points 304A, 304B and 304C at a focal distant 307 behind the lens (below the lens, as illustrated). Rather, the spatial profile of the incident surface of the embodiment 300 (identified with respect to the incident light wavefront 324; in this example—a substantially planar wavefront) such a combination of the contiguous surface-relief areas that, when taken together, corresponds to a combination of the spatially-overlapping within the aperture 302 multiple (in this example—three) spatial distributions of phase that would be produced by the presence of the three independent Fresnel lenses as received above. In other words, the combination of the specifically-defined contiguous surface relief areas—later, in reference to FIG. 3B identified as 342, 344, 346—is configured such as to aggregately produce the effect that would be produced by the presence of three independent Fresnel lenses spatially-shifter with respect to one another as identified above and independently operating on the incident light.

One of such spatial distributions of phase corresponds to and represents the spatial distribution of phase that hypothetically-present (as marked by the centrally-located location-identifying pattern 312) would produce and is represented by the function ϕ(x, y); another corresponds to that which another Fresnel lens (should it be present at the location marked by the location-identifying pattern 308) would produce and is represented by the function ϕ(x−$x_1$, y); and the third one corresponds to that which yet another Fresnel lens (should it be present at the location marked by the location-identifying pattern 314) would produce and is represented by the function ϕ(x+$x_2$, y). Here, $x_1$ and $x_2$ are spatial offsets between the neighboring focal points 304A, 304B, 304C along the chosen axis in the plane of the embodiment 300 (which is the x-axis in this example). In this example, the axis 328 that is drawn substantially normally to the substrate 316 and that corresponds to the center of the identifying pattern 312 is chosen to be a reference axis, while the other axes corresponding to the centers of the location-identifying patterns 308, 314 are spatially offset with respect to that of the pattern 312. Understandably, the values of such spatial offsets may differ from one another or be substantially equal, and the number of the focal points is design-dependent.

For Fourier ptychography imaging applications, for example, the overlap between areas of multiple (the three, in this case) constituent conventional Fresnel lens patterns 308, 312, 314 can generally range from 50 to 90 percent in order to reconstruct an image with resolution high enough for practical applications. (An overlapping area—or area of overlap—of a first pattern and a second pattern is defined as a portion of the total aperture 302 within which each of these patterns samples the same portion of the incoming optical wavefront 324 before the division of the total aperture 302 into areas or zones such as 342, 344 and 346). For other applications, such as collimation of multiple lasers beams or customized illumination purposes, the overlap can be larger or smaller. Notably, as a person of skill will appreciate, the focal points 304A, 304C do not lie on the optical axis 328.

FIG. 3B provides illustration to an example of a specifically-arranged spatial pattern of the multiple contiguous areas of the SPDB-lens 300 possessing the phase distribution within the aperture 302 corresponding to that of FIG. 3A.

Here, the aperture 302 of the lens 300 is subdivided into an array or grid 336 of square-shaped zones or areas 342, 344, 346. A 3-by-3 sub-portion 350 of the grid 336, illustrated in inset, demonstrates the mutual positioning of the constituent areas 342, 344, 346 across the grid 336. The overall area of the lens 300 bound by the aperture 302 is completely covered, laid or tiled contiguously (and periodically, in this example) with the surface relief areas 342, 344, 346. Square 342 represents an area of the lens 300 with the phase profile corresponding to the pattern 308—that is, $\phi(x-x_1, y)$; square 344 represents an area of the lens 300 with the phase profile corresponding to the pattern 312—that is, $\phi(x, y)$; and square 346 represents an area of the lens 300 with the phase profile corresponding to the pattern 314—that is, $\phi(x+x_2, y)$. In the example of FIG. 3B, $x_1=x_2$.

An example of a design of an embodiment of a tri-focal lens structured according to the idea of the invention is represented in FIG. 3B: such embodiment is configured to implement the performance that would be demonstrated by the operationally-equivalent presence of the three constituent Fresnel zone patterns indicated in FIG. 3A. An embodiment of the invention addresses the operationally-equivalent combination of Fresnel zones patterns 308, 312, 314 with diameters of 10 mm, and offsets $x_{1,2}$ of 3 mm. The material refractive index n of the embodiment is that of polycarbonate and is equal to about 1.592 at $\lambda=520$ nm. The focal lengths defined by the operationally-equivalent combination of the lens patterns 308, 312, 314 that the embodiment of the invention emulates are set to be 20 mm. The dimension of the total aperture 302 is 12 mm by 18 mm. The size of each of the phase-areas 342, 344 and 346 is 0.2 mm by 0.2 mm. Accordingly, in this example there are 60×90=5400 different phase zones or areas 342, 344, 346 within the bounds of the aperture 302 that, aggregately, define the embodiment of the invention The phase functions $\phi(x, y)$ of the operationally-equivalent lens patterns 302, 308 and 312 are defined by Equation (1) for diameter less than or equal to 10 mm and are substantially zero for diameters greater than 10 mm. It is the phase distribution corresponding to these phase functions, therefore, that is characterizing the embodiment of the invention as well. The phase distribution is related to the height h(x, y) of the surface profile as $\phi(x, y)=2\pi nh(x, y)/\lambda$, from which the heights of each of the areas 342, 344, 346 across the overall aperture 302 is, therefore, determined. For $2\pi$ phase shift, the height is chosen to be 326.63 nm. Within each of the zones/areas 343, 344, 346 the surface profile of the used optical substrate within the bounds of the aperture 302 varies to emulate the combination of phase distributions introduced by the corresponding operationally-equivalent conventional Fresnel lens patterns 308, 312, 314. In some embodiments, the variation may be continuous. In other embodiment, the variation may be discrete due to fabrication constraint. For example, the step size is multiple of 2.55 nm (equal to 326.63/128 nm) for the case where the number of step size for the surface profile is limited to 128.

In a related non-limiting implementation, the areas 342, 344, 346 may be distributed across the aperture 302 substantially aperiodically or even randomly on the predefined square grid 336 as long as the above-identified conditions are approximately satisfied. Another related embodiment of the SPDB-lens structured according to the idea of the invention can be configured as an optical-metasurface-based, substantially planar optical element 400. For the purposes of this disclosure and the appended claims—and unless expressly defined otherwise—the term "optical meta-surface" or, interchangeably, simply a "metasurface"—is typically used to refer to and define a material interface that has such structures on it that impose particular phase shifts on light interacting with this material interface—that is, which is either transmitted through or reflected off the interface. In some cases, the optical metasurface may include a planar array of subwavelength electromagnetic structures that emulate the operation of a conventional, bulk refractive, birefringent, or diffractive optical component (such as, in non-limiting examples, a lens, a waveplate, a polarizer or a hologram) through individually tailored amplitude, phase, or polarization transformations imposed by the metasurface on incident light with which such metasurface interacts.

Figures 4A, 4B:
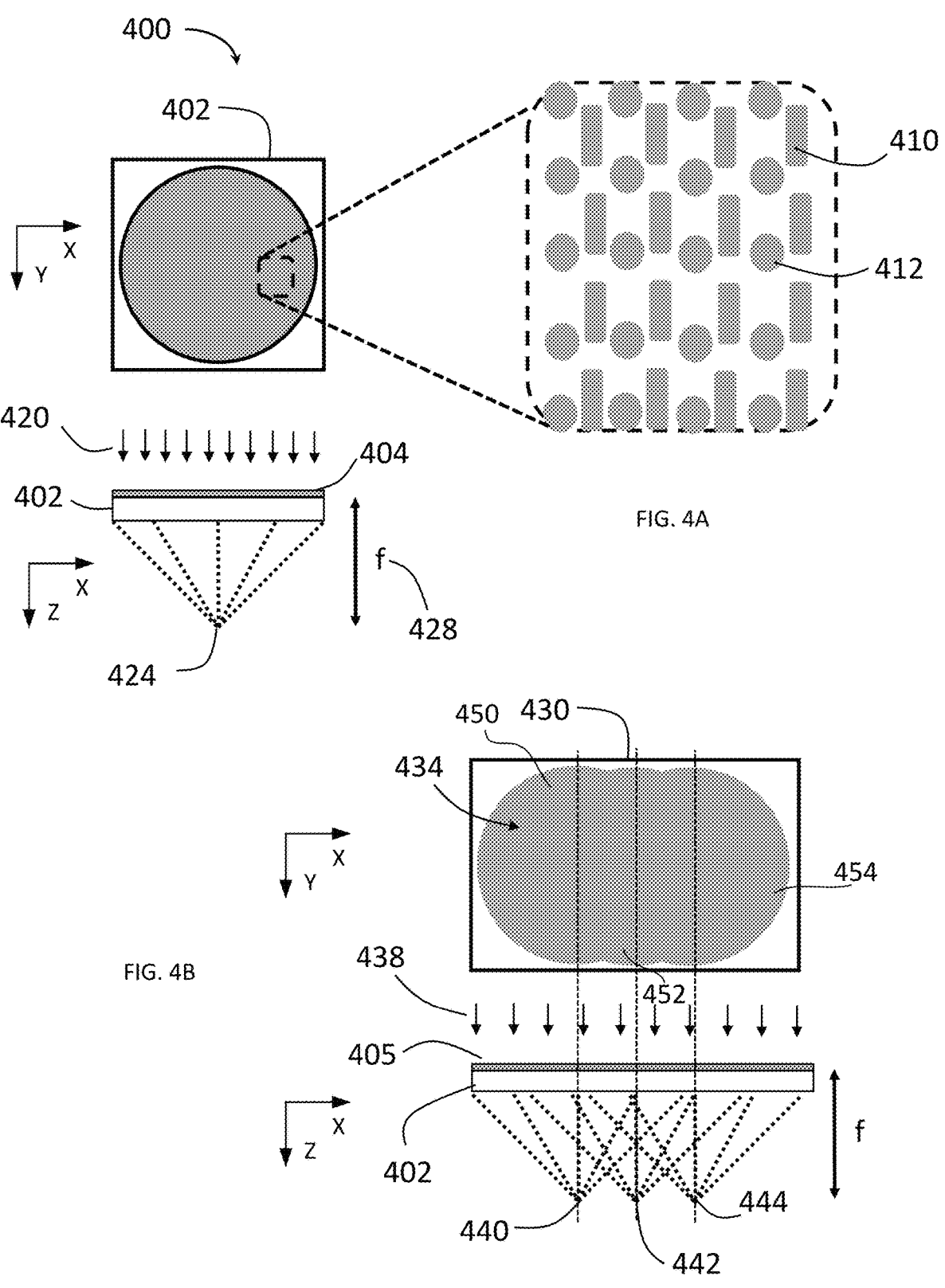
FIG. 4A schematically illustrates a principle of a conventionally-structured metasurface based lens (in top view, side view, and inset), while FIG. 4B schematically illustrates (in top and side views) a diffractive embodiment that is structured according to the idea of the invention with the use of a metasurface/metamaterial.

In reference to the schematic of FIG. 4A, and as discussed, for example, in U.S. Pat. No. 10,634,557 a simple metasurface-based flat lens element 400 configured to have a single focal point can be formed by forming a layer of metamaterial 404 on the glass substrate 402. The layer 404 includes appropriately-patterned micro/nano-fabricated elements of titanium dioxide, for example (schematically illustrated as 410, 412) to provide a spatially-varied distribution of phase of a diffractive element for incoming light 420 and to converge the incident collimated light into a point 424 at a focal length 428 behind the lens 400.

Now, in reliance on the same lithography-based fabrication methodology, an embodiment 430 of the diffractive metamaterial/metasurface-containing SPDB-lens of FIG. 4B can be configured according to the idea of the invention to have a complex aperture phase function defined by a layer of metamaterial/metasurface 434 configured to emulate a performance of an operationally-equivalent combination of three conventional Fresnel lens patterns such as to converge the incident light 438 into multiple focal points (shown in this example as three foci 440, 442, 444). The complex aperture 430 of the lens 430 is formed from an array of the zones or areas of the layer 434 while each of the areas introduces the phase delay defined according to the idea of the invention. An example of a design of an embodiment of a tri-focal lens structured according to that the idea of using a metasurface, sketched in FIG. 4B—to implement/emulate the performance that would be demonstrated by the operationally-equivalent presence of the combination of the three constituent Fresnel zone patterns indicated in FIG. 4A—addresses the diameters of the operationally-equivalent Fresnel lens patterns schematically indicated as 450, 452, 454 of 10 mm. The phase distribution $\phi(x, y)$ that would be introduced by a constituent lens pattern (450, 452, or 454) can be defined from Equation (1) for a diameter value that is smaller than or equal to 10 mm and is equal to zero for diameter valued greater than 10 mm. The offsets $x_{1,2}$ between these patterns along the x-axis are 3 mm. The operating wavelength $\lambda=520$ nm. The metasurface is configured based on and from a thin layer of patterned $TiO_2$ (about 120 nm in thickness) on a fused silica glass substrate, with discs having different diameters and different thicknesses, determined based on the results presented in Nature Computational Materials 6:116; 2020 (available at nature.com/reprints; see also doi.org/10.1038/s41524-020-00369-5) the disclosure of which is incorporated herein by reference. The focal length f is set to be about 20 mm. The size of the total aperture 430 is 12 mm by 18 mm. The size of each of the constituent areas or zones into which such metasurface is sub-divided (by analogy with areas 342, 344 and 346 of FIG. 3B) is 0.2 mm by 0.2 mm. The amplitude and phase of light transmitted is set by the diameter and pitch of the $TiO_2$ nanodisks aggregately forming the metasurface. (Typical radius and pitch of the spatial distribution of nanodisks are 125 nm and 310 nm respectively.) Results of calculation for square and hexagonal array of nanodisk configurations using FDTD simulation is substantially similar to and follow those described in Nature Computational Materials 6:116; 2020 (in particular, see portions of this publication referencing FIG. 1). In this design, there are 60×90=5400 different zones/areas. The areas are divided into three sets, corresponding to the emulated Fresnel patterns 450, 452, 454, and tiled in a fashion discussed in reference to FIG. 3B. Within each of such zones/areas, the size and density of the nanodisk is set to have the amplitude and phase corresponding to a respective Fresnel pattern (450, 452, or 454).

Figures 5A, 5B:
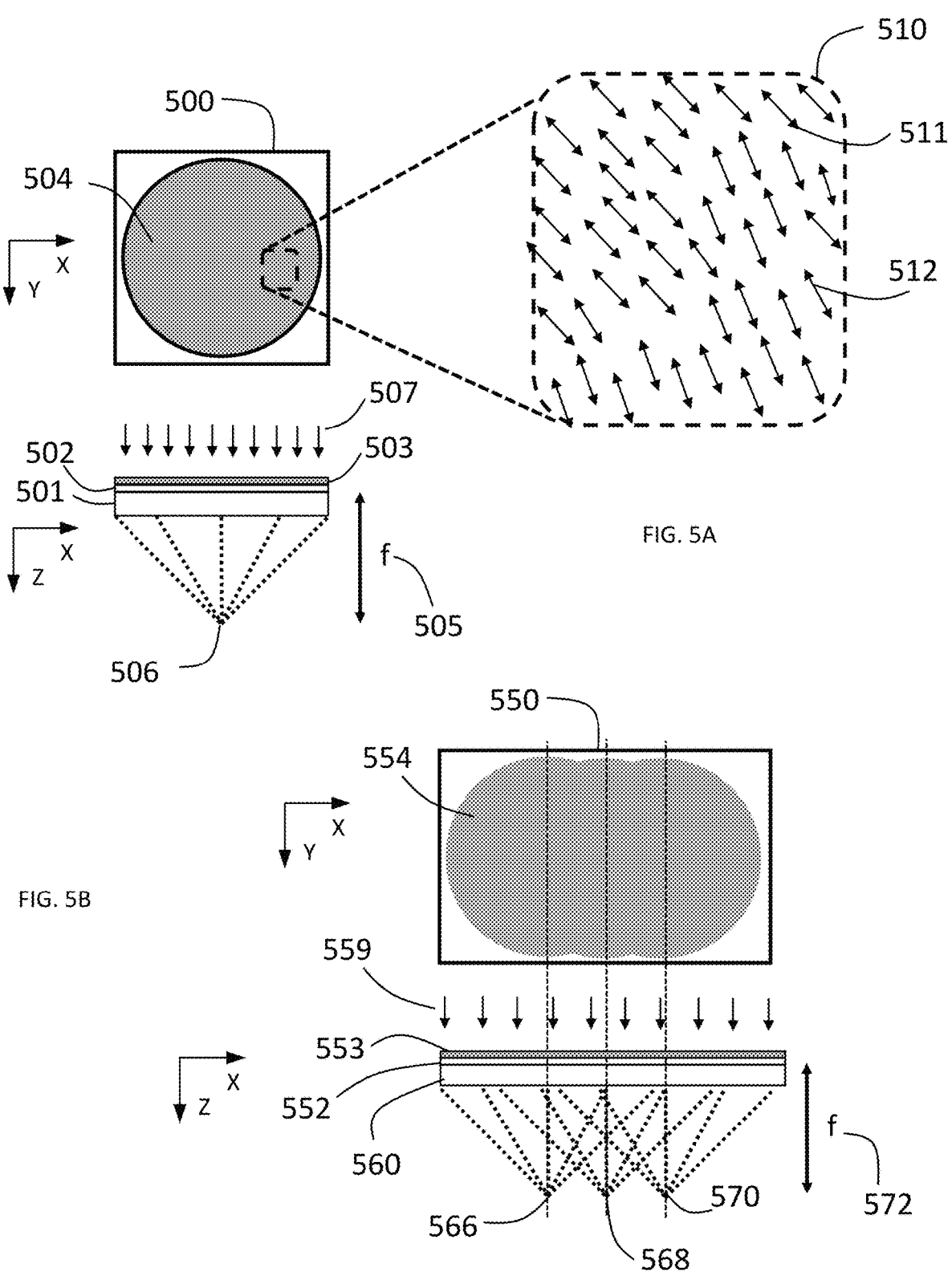
FIG. 5A schematically illustrates a principle of a conventionally-structured liquid crystal based lens (in top view, side view, and inset), while FIG. 5B schematically illustrates (in top and side views) a diffractive embodiment that is structured according to the idea of the invention with the use of a liquid crystal material.

In yet another related implementation, an embodiment of a diffractive lens can be produced with the use of a liquid crystal material. (The liquid crystal flat lens, for example, is also referred to as a geometric phase lens or Pancharatnam Berry phase lens). A conventional single-focus liquid crystal lens (shown as 500 in FIG. 5A) can be made of a thin layer of liquid crystal polymer 504 of different orientations 511 and 512 (which orientation varies across the aperture of the lens. (Examples of fabrication of a liquid crystal layer using photoalignment techniques are disclosed in U.S. Pat. Nos. 8,866,997 and 9,671,538, while example of a design of a liquid crystal lens is disclosed in U.S. Pat. No. 10,705,401, each of which is incorporated by reference herein). In operation of such lens, polarized light 507 (such as, for example, circularly polarized light) passes through a liquid crystal layer 503, an alignment layer 502, and a transparent substrate 501 and is converged into a point 506 at a focal length 505 behind the lens.

Utilizing the same liquid-crystal based structural principle, an embodiment of the diffractive optical SPDB-lens 550 (FIG. 5B) has a complex aperture 554 and provides multiple focal points spatially distributed along the surface of the lens. Here, incoming light 559 passes through a thin layer of liquid crystal polymer 553 and alignment layer 552 on a transparent substrate 560 and is focused into three points 566, 568 and 570 at a focal length distance 572 behind the lens. The aperture of the lens 554 is, in this example, divided into a grid of three types of square-shaped areas or zones, similar to that of the configuration discussed in reference to FIG. 2B. Each of the three types of square areas or zones is made of liquid crystal layer with such orientations that introduce, across a corresponding area or zone, a respective phase shift the overall, aggregate combination of which across the aperture 550 results in formation of the three focal points 566, 568 and 570.

Figure 6:
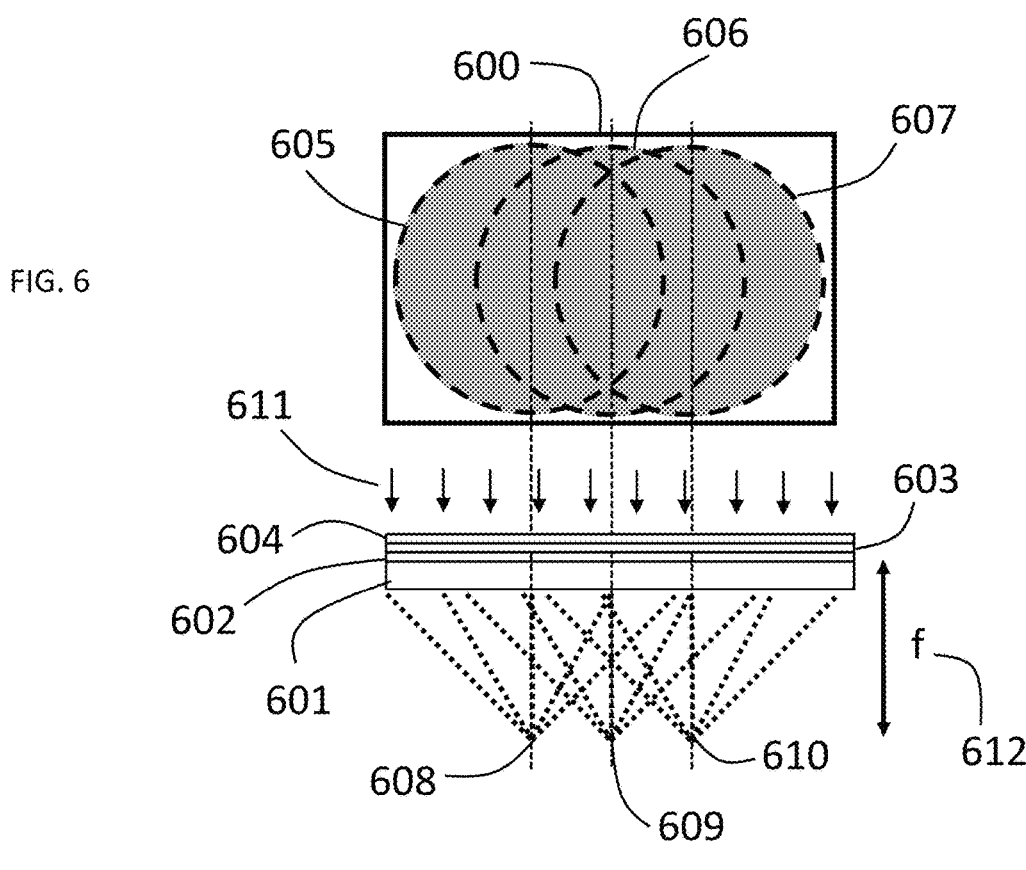
FIG. 6 schematically illustrates an embodiment of the invention containing multiple diffractive layers of similar or dissimilar materials forming a layer stack.

In some embodiments of complex aperture SPDB-lens structured according to an idea of the invention, multiple diffractive layers forming a layer stack (in combination of similar or dissimilar materials such as a holographic material, a liquid crystal material and/or a metamaterial, for example) may be employed, as is schematically illustrated in FIG. 6. Here, a diffractive SPDB-lens 600 (configured to emulate and mimic a performance of an operationally equivalent combination of three independent Fresnel lenses the operationally-equivalent locations of which are marked with identifying indicia 605, 606, 607) utilizes multiple (as shown—three) layers of phase-delay-introducing materials 602, 603 and 604. Incoming substantially planar light wavefront 611, incident onto the lens 600 is converged into multiple focal points (shown in this example as 608, 609 and 610). In this specific example, multiple focal lengths of the lens 600 are chosen to be substantially equal.

Figure 7:
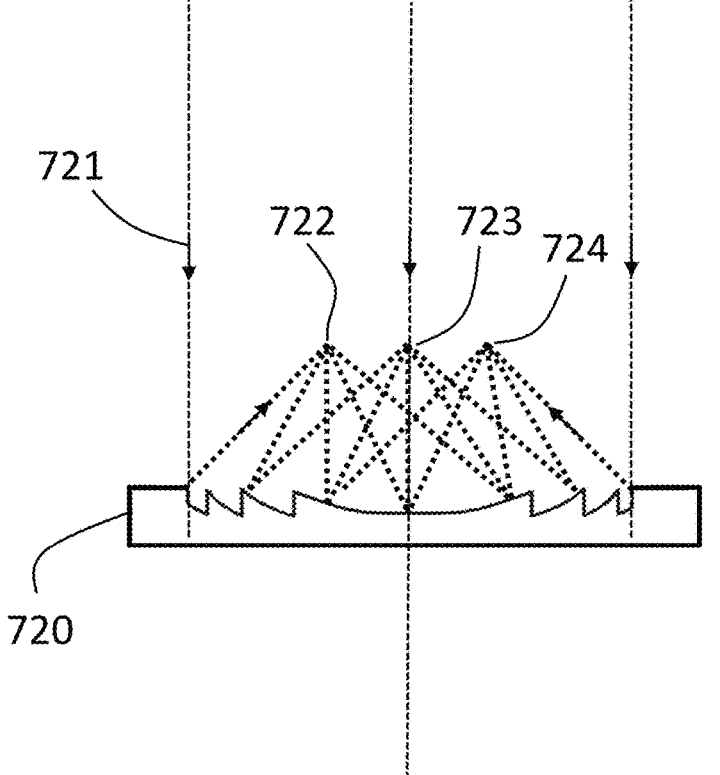
FIG. 7 illustrates a principle of operation in reflection of an embodiment of the invention.

While most of the above-presented examples illustrated an embodiment of the multi-focal diffractive optics operating in transmission, a skilled person will appreciate that a related embodiment can be structured to operate in reflection. As is schematically shown in FIG. 7, for example, the incident surface of the embodiment 720 of the lens (structured according to the idea of the invention—for example by analogy with the embodiment 300) may be coated to form a reflector, as a result of which the lens 720 will form multiple focal points (shown here as 722, 723, 724) in the incident space (that is, on the same side of the lens 720 from which the incident light 721 arrives to the lens). In it understood that the incident surface of the lens may be formatted differently—with the use of one or more of diffractive layers (by analogy with the structure of FIGS. 4B, 5B, 6).

A skilled artisan will immediately appreciate advantages provided by implementation of an embodiment of the lens constructed according to the presented idea. In conventional Fourier ptychography, for example, the complex image of an object is constructed by sequentially, at different times acquiring multiple images of the object under different coherent light illumination. The conventionally-used imaging system typically includes a single camera with multiple sources of illumination turned on and off at different times. Each measurement provides a limited amount of information in the Fourier space of the image, and combination of many measurements taken over a period of time, sequentially, may be used to possibly provide sufficient information to reconstruct the complex image with diffraction-limited resolution. (Such technique utilizes iterative phase retrieval algorithms described in U.S. Pat. No. 10,652,444, for example, the disclosure of which is incorporated by reference herein).

To this end, an embodiment of the invention provides a snapshot version of a Fourier ptychographic imaging system that utilizes an embodiment of a multi-focal diffractive optics discussed above and that is configured to acquire the same imaging information in one optical frame (in one snapshot) as that acquired in multiple, temporally sequenced imaging frames acquired in operation of a conventionally-structured Fourier ptychographic imaging system. In this configuration, a necessarily single, one source of coherent light illumination is used (and not multiple sources), and multiple images of the object are acquired at the same time, in a single snapshot and not sequentially, which can be used to construct a higher resolution image of the object. (An example of the reconstruction algorithm that can be used for this purpose is described, for example, in Nature Photonics Vol. 7, p. 739, September 2013; the disclosure of which is incorporated by reference herein.) The light source can be a light emitting diode or a laser. The polarization state of the light source can be controlled by using a polarization and/or retarder filter. For example—and in reference to FIG. 8A—the proposed embodiment of a one-snapshot imaging system may utilize an embodiment of the lens 800 having such a distribution of phase across its overall aperture as to be configured to emulate or resemble the presence of multiple (in this case—six, the boundaries of which are schematically indicated as 806, 807, 808, 809, 810, and 811) individual Fresnel lenses each operating such as if the other Fresnel lenses were not present. In this example, the lens 800 is configured to form a 2×3 array of equal focal length DOEs. The overlap between the areas of the lens 800 that would correspond to such individual lenses may be about 75 percent.

In operation of the system, the object 821 is illuminated by only one, single coherent light source (not shown). Light reflected from the object is imaged onto the sensor array using the embodiment 800 of the lens. In that, light 804 incident from the object 821 passes through a diffractive optical layer 802 on a transparent substrate 801 and an array of aperture stops 812 (which aperture stops are optional, but may be used to increase a signal-to-noise ratio of the imaging process is so desired) onto a detector/sensor array 803 into multiple locations of the surface of the detector array at a focal length 805 behind the lens. The so-formed array of inverted images 823 (in the example as shown—a 2×3 array) is acquired and measured by the sensor array 803. Each of the multiple, simultaneously acquired inverted images is used to reconstruct a higher resolution image of the object 821. (See the above-referred to Nature Photonics reference.) The array of aperture stops 812 can be a mask made of a 2 by 3 array of circular openings that control the amount of light going to each of the six focal points. The detector array 803 can be a CMOS, CCD, SPAD, EMCCD, micro-bolometer array or polarization sensitive focal plane array, depending on the specifics of particular implementation. (Understandably, in a related embodiment, the array of focal points formed by the embodiment of the lens can be dimensioned according to a specific design—for example, 20 by 20, in which case the number of images of the object formed in the plane of the detector array 803 at the same time would be 400. In yet another embodiment, the array of lens can be 100 by 100, resulting in 10,000 simultaneously and in parallel acquired images).

Figure 8B:
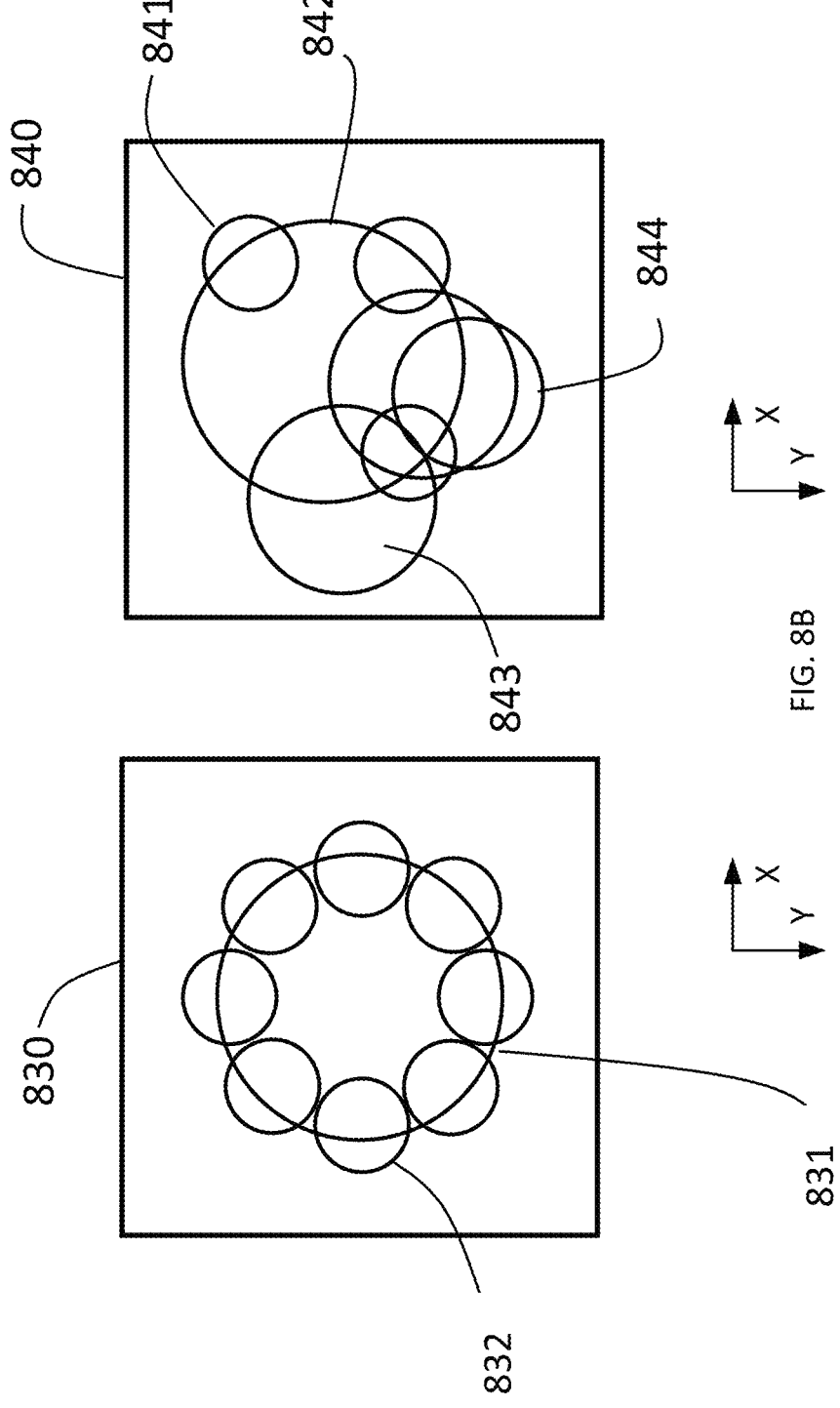
FIG. 8B schematically illustrate two related concepts of implementation of an optical system containing multiple embodiments of a lens configured according to the idea of the invention FIGS. 9A, 9B contain two views each and schematically illustrate a related embodiment of the invention.

The individual sizes of and separation between the constituent contiguous areas having different phase characteristics discussed above that correspond to zones of so-emulated individual Fresnel lenses across the embodiment of the complex-aperture lens of the invention employed in a Fourier ptychography system does not have to be constant. FIG. 8B, for example, schematically illustrates two different arrangements of such zones of the overall complex aperture lens.

In the first example shown on the left of FIG. 8B, a complex aperture lens 830 is configured to simulate the simultaneous operation of nine (9) individual conventionally-structured diffraction lenses of two varieties (a single emulated Fresnel lens of the first variety is schematically represented by a boundary 831, while the other eight emulated Fresnel lenses—each indicated by a corresponding closed curve 832—form an array disposed substantially circumferentially with respect to a center of the first lens).

In this example, understandably, the overall embodiment 830 is configured to produce, in light incident onto the embodiment along the z-axis, nine individual diffractive images on an object—one at each of the locations that are distributed in a surface transverse to the z-axis and that respectively correspond to the optical centers of the multiple emulated Fresnel lenses schematically indicated with curves 831 and 832. The longitudinal separations of these images from the plane of the embodiment 830 along the z-axis are not necessarily the same and are defined, in part, by the phase function corresponding to the emulated lens 831 and the phase functions corresponding to the emulated lenses 832. In terms of the transverse arrangement of the images (that is, as viewed along a surface transverse to the z-axis), however, there will be formed an array of eight images substantially surrounding a centrally located image of the object.

In the second example, indicated on the right side of FIG. 8B, a complex aperture of the overall diffractive lens 840 is configured to simulate seven (7) individual lenses of four different types (schematically represented by respectively-corresponding closed curves or lines 841, 842, 843 and 844, arranged in a random fashion. Here, there is shown only one simulated Fresnel lens of the type 842, two emulated Fresnel lenses of the type 843, one emulated Fresnel lens of the type 844, and three emulated Fresnel lenses of the type 841 disposed along a circumference of the lens 842. In this example, understandably, the overall embodiment 840 is configured to produce, in light incident onto the embodiment along the z-axis, 7 individual diffractive images on an object—one at each of the locations that are distributed in a surface transverse to the z-axis and that respectively correspond to the optical centers of the multiple emulated Fresnel lenses schematically indicated with curves 841, 842, 843, 844.

In other examples, an embodiment of the diffractive SPDB-lens of the invention simulation/emulation the operation of a combination of multiple conventional Fresnel lenses (each operating individually as if the rest of the Fresnel lenses from the combination were not present) can be configured such as to defined the diameters/sizes of and separation between the emulated Fresnel lenses to match a particular scene to be measured and/or imaged. In this case, a particular region of the scene characterized (in optical imaging sense) by large spatial frequency(ies) and variations may be imaged by those areas or zones of an embodiment of the DOE element configured according to the idea of the invention that overlap with higher spatial density, in order to provide higher imaging resolution. (An example of a fixed array camera that can recover images upscaled by 6.7× in spatial resolution relative to the single aperture limit is described, for example, in Optics Express Vol. 3, No. 2, p. 2585, January 2022, the entire disclosure of which is incorporated by reference herein).

Figure 9A:
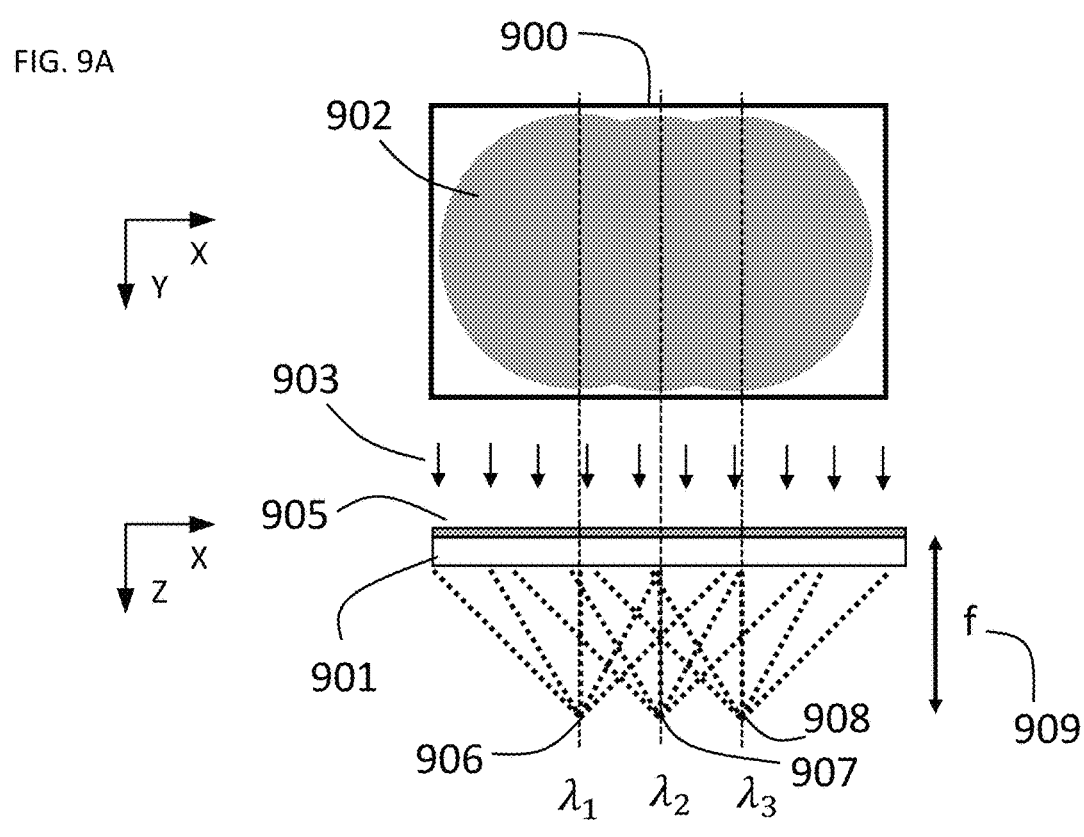
FIG. 9C contains two views addressing yet another related embodiment of the invention.
FIG. 9D illustrates another embodiment of the invention.

Conventionally-structured diffractive lenses are often designed to operate at a narrow wavelength band. Optionally, an embodiment of the complex aperture lens 900, configured according to the idea of the invention and illustrated in FIG. 9A, can be designed to operate at multiple spectral bands (in this example illustrated with the use of wavelength designators $\lambda_{1,2,3}$). The embodiment 900 of the SPDB-lens is schematically shown to be a structure to emulate the operation of a 1-by-3 array of conventionallyconfigured Fresnel lenses 902 (each operating as if the other two of the lenses 902 were not present). A portion of polychromatic incident light 903 having wavelength A passes through a diffractive layer 905 on a transparent substrate 901 and is focused to a point 906 at a distance 909 behind the lens 900. A portion of incident light 903 having wavelength $\lambda_2$ passes through the diffractive layer 905 on the transparent substrate 901 and is focused to a point 907. Similarly, incoming light 903 at wavelength $\lambda_3$ passes through the diffractive layer 905 on a transparent substrate 901 and is focused to a point 908.

Figure 9B:
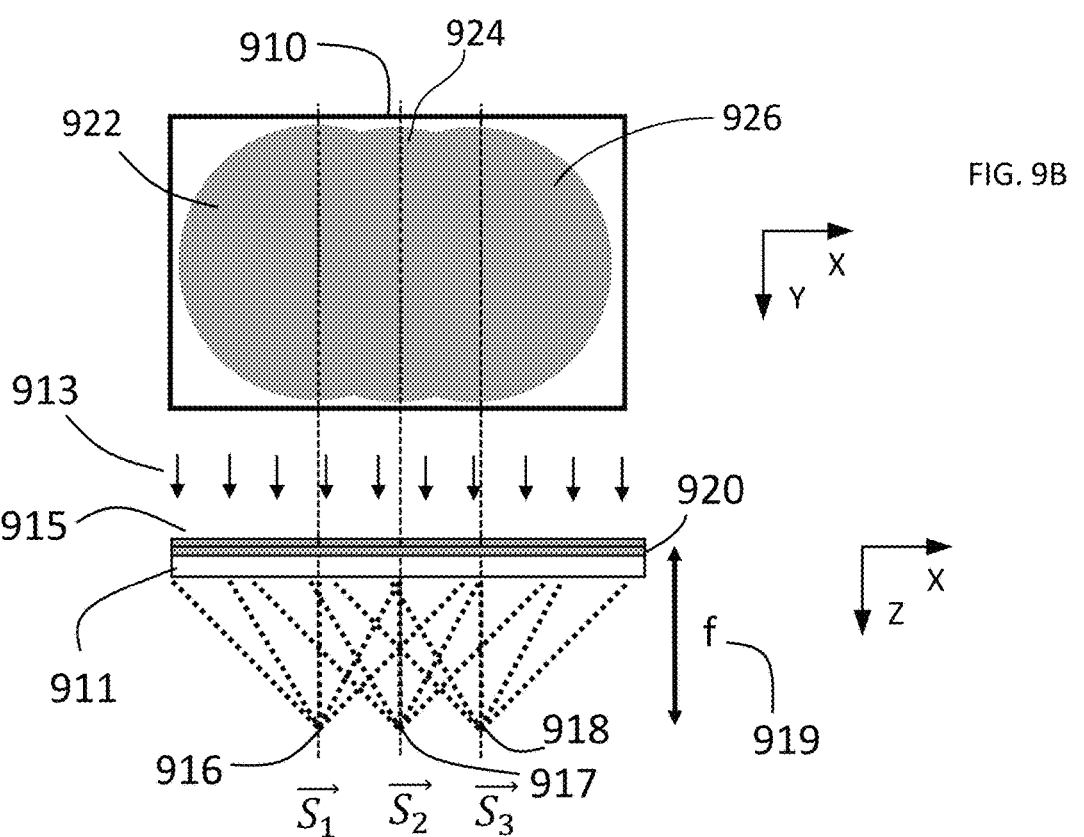

Diffractive lens such as liquid crystal lens is often designed to operate when incident light has a specific polarization state. To emulate this type of operation, a complex aperture lens 910, configured according to the idea of the invention, is shown in FIG. 9B to operate with light having different and/or multiple polarization states $\overrightarrow{S}_{1,2,3}$. $\overrightarrow{S}$ denotes the four component Stokes parameter of the polarization state of light. The lens 910 is emulating the operation of a 1-by-3 array of individual diffractive lenses 912. A portion of incoming light 913 with polarization state corresponding to $\overrightarrow{S}_1$ passes through a liquid crystal polymer layer 915 and an alignment layer 920 on a transparent substrate 911 and is focused to a point 916 at a distance 919 behind the lens. At the same time, a portion of incoming light 913 with polarization $\overrightarrow{S}_2$ passes through the liquid crystal polymer layer 915 and the alignment layer 920 on the transparent substrate 911 and is focused to a point 917, while a portion of the incident light 913 having polarization $\overrightarrow{S}_3$ is focused to a point 917.

An example of a design of an embodiment of a tri-focal lens structured according to that the idea sketched in FIG. 9B (based on a liquid crystal layer)—to implement/emulate the performance that would be demonstrated by the operationally-equivalent presence of the combination three constituent Fresnel lens zone patterns lens 922, 924 and 926 of diameter equal to 10 mm. The offsets $x_{1,2}$ of these patterns along the x-axis are 3 mm. The operating wavelength is $\lambda$=520 nm. The liquid crystal layer is based on commercially available liquid crystal polymer made by EMD Electronics (The Electronics business of Merck KGaA, Darmstadt, Germany) on fused silica glass. The focal lengths of the embodiment of FIG. 9B are set to be 20 mm. The dimensions of the total aperture 910 of the embodiment are 12 mm by 18 mm. The liquid layer is "tiled"—by analogy with a pattern depicted by the schematic of FIG. 3B The size of each tile/area/zone (shown as 342, 344 and 346 in FIG. 3B) is 0.2 mm by 0.2 mm. The phase function $\phi(x, y)$ that would be introduced by each of the patterns 922, 924, 926 is that defined by Equation (1) for diameter less than or equal to 10 mm and is equal to zero for diameter greater than 10 mm. (The phase function of each of the zones 342, 344, 346 across the total aperture 910 is calculated accordingly.) The phase of the transmitted light is set by the thickness, orientation of the liquid crystal polymer and type of the liquid crystal polymer. Each of the operationally-equivalent combination of conventional Fresnel patterns 922, 924, 926, to be emulated by the tiled embodiment of the invention, is designed to operate in input light of right circularly polarized light with Stokes parameters S=[1,0,0,1]. (For operation in input light of a different Stokes parameters, a wave plate may be placed in front of the lens that converts the incoming light to right circularly polarized light. It is possible to have a different wave plate for each of the emulated patterns 922, 924, 926, such that each constituent pattern focuses light of different Stokes parameters. The wave plate can be implemented by using at least one additional layer of liquid crystal polymer with the right fast axis orientation. For example, a quarter wave plate may be used to convert linear polarized light to circular polarized light. In some embodiments, a linear wire grid polarizer layer may be added, depending on the desired Stokes parameters.) The relationship between the phase and the parameters of the liquid crystal polymer (organized in tiles/zones/areas (by analogy with the tiles/zones 342, 344, 346 of schematic of FIG. 3B)—along with a fabrication process for a lens, is described in Optics Express Vol. 30, No. 2, 2487, 2022, the disclosure of which is incorporated herein by reference). The orientation of liquid crystals is determined by a photo alignment layer fabricated using polarized ultraviolet light lithography. In this design, there were 60×90=5400 different areas/zones/tiles. The tiles/areas of the liquid crystal layer are divided into three sets, corresponding to the patterns 922, 924, 926. Within each area or tile, the liquid crystal polymer was set to have a phase corresponding to a pattern of 922, 924, 926. Multiple layers of liquid crystal polymer of different type, orientation and thickness can be used alternatively or in addition to improve the performance of the embodiment of the invention. For example, an additional layer of liquid crystal polymer with different crystal orientation can be added on top of each of patterns 922, 924, 926 to focus (or, generally, to change a degree of convergence of) light of different polarization states.

In yet another implementation, according to the idea of the invention, a complex-aperture diffractive lens having multiple focal points can be designed with different object and image conjugate points. To this end, an embodiment of the lens 930, shown in FIG. 9C, can be designed to have different image conjugate points. By analogy with the embodiments discussed above, the embodiment of the lens 930 is dimensioned to emulate a performance of a 1 by 3 array of individual diffractive lenses 932. Incoming light 933 passes through a diffractive layer 935 on a transparent substrate 931 and is focus to a point 936 at a distance 939 behind the lens. Incoming light 933 passes through a diffractive layer 935 on a transparent substrate 931 and is focus to a point 937 at a distance 940 behind the lens. Incoming light 933 passes through a diffractive layer 935 on a transparent substrate 931 and is focus to a point 938 at a distance 941 behind the lens.

Figure 9C:
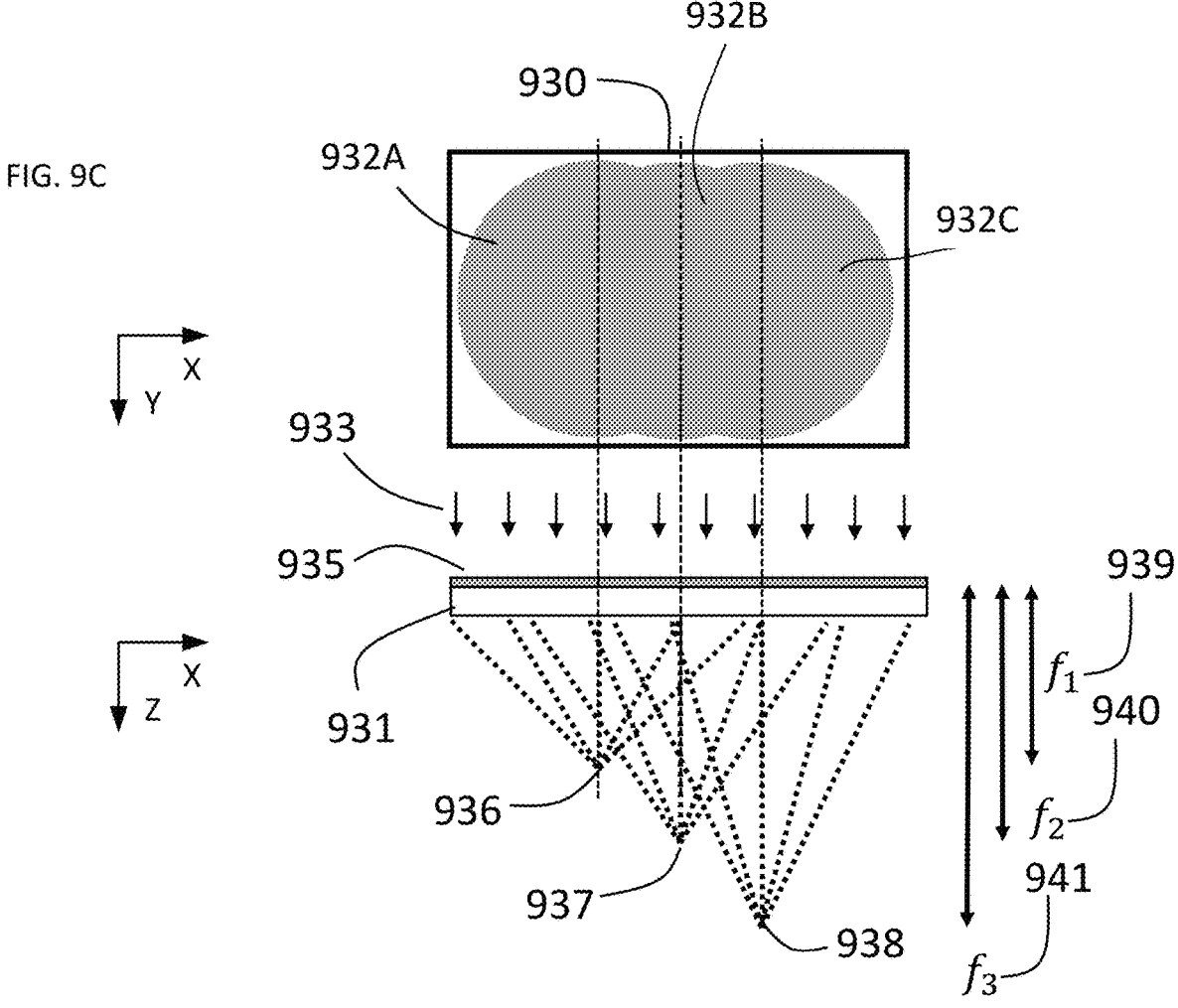

By analogy with previously-discussed examples, the embodiment of FIG. 9C was structured in a fashion schematically illustrated in FIG. 3B (that is, with the use of a combination of three difference phase areas/zones/tiles similar to 342, 344, 346) to emulate a performance of a combination of three Fresnel lens patterns 932A, 932B, 932C, the diameter of each of which is is 10 mm. The offsets $x_{1,2}$ of the patterns 932A, 932B, 932C are 3 mm. The material refractive index n of the embodiment is that of polycarbonate and is equal to 1.592 at $\lambda$=520 nm. The focal lengths for the portions of the embodiment corresponding to emulated patterns 932A, 932B, 932C were chosen, respectively, to be 20 mm, 30 mm, and 40 mm. The size of the total aperture 930 was 12 mm by 18 mm. The size of each constituent area/tile 342, 344 and 346 is 0.2 mm by 0.2 mm. The phase functions $\phi(x, y)$ of the patterns to be emulated (932A, 932B, 932C) are those expressed by Equation (1) with the designed focal length for diameter less than or equal to 10 mm and is equal to zero for diameter greater than 10 mm; and the phase distribution provided by the embodiment of the invention containing "tiles" 342, 344, 346 covering the total aperture 930 is calculated accordingly The determined phase distribution is related to the height h(x, y) of the surface profile as $\phi(x, y)=2\pi nh(x, y)/\lambda$; accordingly, based on the determined phase distribution the material thicknesses of the embodiment across the aperture 930 is uniquely determined. For $2\pi$ phase shift, the height is 326.63 nm. In this design, there are 60×90=5400 different areas. The areas are divided into three sets, operationally corresponding to the conventional Fresnel lens patterns 932A, 932B and 932C. The tiling of the areas is illustrated in FIG. 3B. Within each area, the surface profile varies depending on the phase of the corresponding lens. In some embodiment, the variation may be continuous. In other embodiment, the variation may be discrete due to fabrication constraint. For example, the step size is multiple of 2.55 nm (equal to 326.63/128 nm) for case where the number of step size for the surface profile is limited to 128.

Figure 9D:
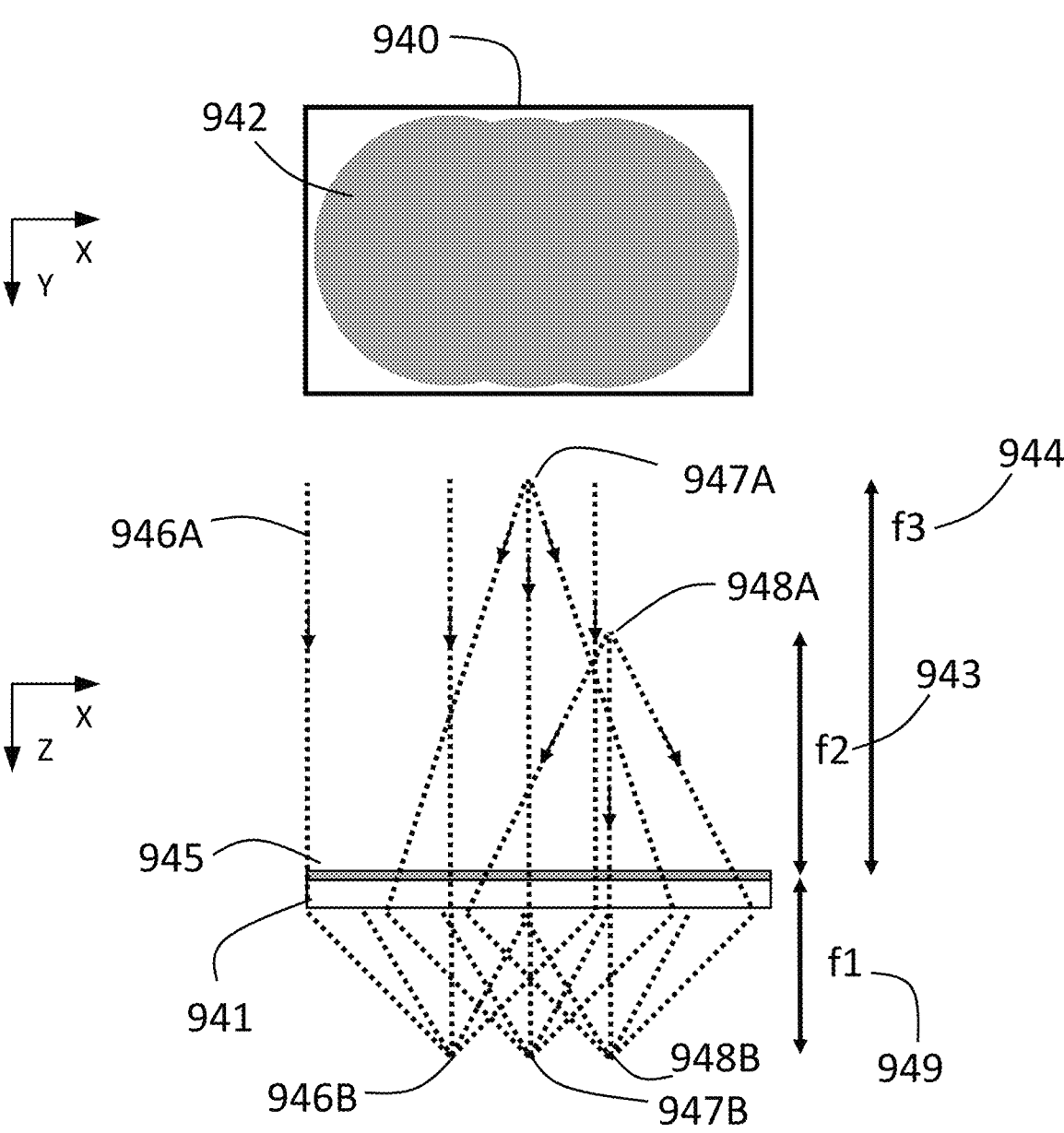

In yet another example, an overlapping apertures lens 940, shown in FIG. 9D, can be designed to have different object conjugate points. The lens 940 is a 1 by 3 array of lenses 942. Incoming light 946A, arriving from infinity, passes through a diffractive layer 945 on a transparent substrate 941 and is focused to a point 946B at a distance 949 behind the lens. Incoming light 947A, located at a distance 944 in front of the lens, passes through a diffractive layer 945 on a transparent substrate 941 and is focused to a point 947B at a distance 949 behind the lens. Incoming light 948A, located at a distance 943 in front of the lens, passes through a diffractive layer 945 on a transparent substrate 941 and is focused to a point 948B at a distance 949 behind the lens.

It is appreciated that, as used in this disclosure, the term focal point is defined and referred to as a point at which rays or waves meet after reflection or refraction, and the reference to multiple focal points includes the situation in which light propagates through an embodiment of the invention with a multiplicity of different object-to-image distance ratios. An object distance is the distance between the lens and a portion of the object space that is imaged into a particular portion of the image space. An image distance is the distance between such portion of the image space and the lens. In a paraxial approximation, and for a simple lens with a single focal length f, the condition 1/u+1/v=1/f is satisfied, where u is the object distance and v is the image distance. The term interaction of light with the lens includes either reflection from the lens or transmission through the lens or both.

Overall, the skilled person having an advantage of this disclosure, readily appreciates that the aperture function (and, in particular, a phase distribution across the aperture) of an embodiment of the diffractive lens of the invention—while it relates to an aperture function of a conventional phase Fresnel lens element, for example—is substantially more complex and results in converging light incident onto such specific lens into a multiplicity of focal points that do not lie along the same axis transverse to the surface of such lens.

Techniques that can be employed for fabrication of embodiments of the proposed lens include, without limitation, any of holographic material patterning, diamond turning, injection molding, micro/nano-fabrication of metamaterials and/or metasurfaces, and/or patterning of liquid crystal layers, to name just a few. In at least one practical implementation, the diffractive lens is structured according to the idea of the invention is a single (only one, not one of several) monolithic optical device (that is an intractably indivisible, consisting of only one piece device).

Some envisioned examples of applications of the proposed implementations include remote imaging, surveillance, Fourier ptychography, optical displays, and/or collimation of laser light.

The term "image" as used herein refers to and is defined as an ordered representation of detector signals corresponding to spatial positions. For example, an image may be an array of values within an electronic memory, or, alternatively, a visual image may be formed on a display device such as a video screen or printer.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this specification, embodiments have been described in a way that enables a clear and concise specification to bet written, but it is intended and will be appreciated that embodiments may be variously combined or separated without parting from the scope of the invention. In particular, it will be appreciated that all features described herein at applicable to all aspects of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. For example, and while not necessarily discussed in detail in the above disclosure, a specific embodiment of the SPBD-lens may be configured to generally change a degree of divergence or convergence of light incident onto such a lens and, in particular, to form not real by virtual focal points as understood in related art and configured as discussed above and/or to form at least one real focal point and at least one virtual focal point configured as discussed above.

Accordingly, embodiments of the invention provide a diffraction lens configured such as to not necessarily converge incident light but, generally, to change a degree of spatial divergence of said light wavefront such as to define multiple focal points separated from one another along a surface of the diffractive lens by a predetermined non-zero distance (and regardless of whether said light is substantially polychromatic or substantially monochromatic). In one specific case, the same embodiment may be configured to define a real focal spot for a light portion having one set of optical characteristics (such as wavelength and/or polarization, for example) while defining a virtual focal post for a portion of incident light having a different set of optical characteristics. In such a case, of course, when viewed along an axis that is transverse to a normal drawn to the surface of the lens, such foci are separated by a non-zero distance, as discussed above.

The term "and/or", as used in connection with a recitation involving an element A and an element B, covers embodiments having element A alone, element B alone, or elements A and B taken together.

Disclosed aspects, or portions of these aspects, may be combined in ways not listed above. Accordingly, the invention should not be viewed as being limited to the disclosed embodiment(s).

The invention claimed is:

1. A diffractive lens element, comprising:
an optical substrate made of an optical material and having an incident surface, and
a diffractive lens defined in said optical substrate and having an aperture,
wherein a surface of the aperture is substantially completely covered by multiple arrays of contiguous surface areas of the optical substrate,
wherein each array of the multiple arrays has a polygonal perimeter and a plurality of the contiguous surface areas,
wherein, within each of polygonal perimeters, portions of the optical substrate corresponding to different contiguous surface areas vary from one another in a thickness or a refractive index, and
wherein, collectively, the multiple arrays of the contiguous surface areas of the optical substrate produce an effect that would be produced by a presence of multiple independent Fresnel lenses spatially shifted with respect to one another along the optical substrate.

2. A diffractive lens element according to claim 1, wherein the polygonal perimeter is a rectangular perimeter.

3. A diffractive lens element according to claim 1, wherein spatial arrangements of the different contiguous surface areas in a first array and a second array are the same.

4. A diffractive lens element according to claim 1, wherein at least one of the following conditions is satisfied:
the diffractive lens is configured to operate in transmission; and
at least one of multiple focal points of the diffractive lens element is a virtual focal point; and
an array of the multiple arrays is a two-dimensional array.

5. A diffractive lens according to claim 1,
wherein the portions of the optical substrate that vary from one another in the thickness or the refractive index are distributed across the aperture with a substantially uniform spatial density.

6. A diffractive lens element according to claim 1,
wherein, collectively, the multiple arrays of the contiguous surface areas of the optical substrate introduce a phase change in light propagating therethrough that is equal to a phase change produced by a combination of three independent single focal length Fresnel lenses that are shifted with respect to one another along the optical substrate.

7. A diffractive lens element according to claim 1, configured to define multiple focal points, wherein a number of the multiple focal points is equal to a number of the portions of the optical substrate that are within an array of the multiple arrays and that differ from one another in the thickness or the refractive index.

8. An optical imaging system comprising a diffractive lens element according to claim 1.

9. An optical imaging system according to claim 8, configured as a Fourier ptychography system.

10. A method for forming an optical image, the method comprising:
using a diffractive lens element according to claim 1, wherein the diffractive lens of said element does not contain a combination of phase Fresnel lenses with corresponding concentric Fresnel zones:
receiving light at an incident surface of said diffractive lens element, and
converging said light, which has interacted with the diffractive lens element, to multiple focal points that are separated from one another along a surface of the diffractive lens element by a predetermined distance regardless of whether said light is substantially polychromatic or substantially monochromatic.

11. A method according to claim 10,
wherein the converging includes forming multiple focal points that are separated from one another along an axis transverse to the optical substrate.

12. A method according to claim 11, further comprising transmitting said light through the portions of the optical substrate that vary from one another in the thickness or the refractive index and that are distributed across the aperture with a substantially uniform spatial density.

13. A method according to claim 10, further comprising forming multiple optical images of an object space being imaged, each of said optical images located in a respective image plane corresponding to one of said multiple focal points,
wherein
a first image of said multiple optical images has a first ratio of a respective object distance to a respective image distance while a second image of said multiple optical images has a second ratio a respective object distance to a respective image distance.

14. A method according to claim 10, comprising:

interacting said light incident onto the incident surface of the diffractive lens element with a spatial material pattern carried on or formed in the optical substrate.

15. A method according to claim 10, comprising:

delivering a first optical power to a first focal point of the multiple focal points;

delivering a second optical power to a second focal point of the multiple focal points;

wherein a ratio of the first optical power to the second optical power is approximately equal to a ratio of an overall number, within the aperture, of the portions of the optical substrate that have a first thickness or a first refractive index to an overall number, within the aperture, of the portions of the optical substrate that have a second thickness or a second refractive index.

* * * * *